(12) United States Patent
Yoon et al.

(10) Patent No.: US 8,988,621 B2
(45) Date of Patent: Mar. 24, 2015

(54) ARRAY SUBSTRATE AND DISPLAY PANEL HAVING THE SAME

(75) Inventors: Yeo Geon Yoon, Asan-si (KR); Won-Hee Lee, Seoul (KR); Kye-Hun Lee, Cheonan-si (KR); In-Woo Kim, Yongin-si (KR)

(73) Assignee: Samsung Display Co., Ltd., Yongin (KR)

( * ) Notice: Subject to any disclaimer, the term of this patent is extended or adjusted under 35 U.S.C. 154(b) by 1054 days.

(21) Appl. No.: 11/933,391

(22) Filed: Oct. 31, 2007

(65) Prior Publication Data
US 2008/0100555 A1    May 1, 2008

(30) Foreign Application Priority Data
Nov. 1, 2006   (KR) .................. 10-2006-0107006

(51) Int. Cl.
*G02F 1/1343*   (2006.01)
*G02F 1/1337*   (2006.01)
*G02F 1/1362*   (2006.01)

(52) U.S. Cl.
CPC ...... *G02F 1/134336* (2013.01); *G02F 1/13624* (2013.01); *G02F 1/136213* (2013.01); *G02F 2001/134345* (2013.01)
USPC ................ 349/39; 349/38; 349/129; 349/139

(58) Field of Classification Search
CPC ............ G02F 1/1368; G02F 1/136213; G02F 1/133707
USPC ...................... 349/38–43, 129, 139, 142, 143
See application file for complete search history.

(56) References Cited

U.S. PATENT DOCUMENTS

| | | | | |
|---|---|---|---|---|
| 5,943,106 A | * | 8/1999 | Sukenori et al. | 349/39 |
| 7,852,418 B2 | * | 12/2010 | Do et al. | 349/38 |
| 7,944,534 B2 | * | 5/2011 | Tasaka et al. | 349/38 |
| 7,986,377 B2 | * | 7/2011 | Kim et al. | 349/38 |
| 8,094,277 B2 | * | 1/2012 | Tasaka et al. | 349/38 |
| 2004/0114059 A1 | * | 6/2004 | Lee et al. | 349/39 |
| 2006/0066797 A1 | * | 3/2006 | Baek | 349/139 |
| 2007/0030407 A1 | * | 2/2007 | Kwak et al. | 349/38 |

FOREIGN PATENT DOCUMENTS

| | | |
|---|---|---|
| KR | 10-1999-00887992 | 12/1999 |
| KR | 10-2004-0056970 | 7/2004 |

* cited by examiner

*Primary Examiner* — Dung Nguyen
(74) *Attorney, Agent, or Firm* — H.C. Park & Associates, PLC

(57) ABSTRACT

An array substrate includes a gate line, a data line, a thin film transistor (TFT), a pixel electrode and a storage line. The pixel electrode includes a main pixel electrode and a sub pixel electrode partly surrounding at least a portion of the main pixel electrode. The storage line includes a main storage line that extends substantially parallel to the gate line and across the pixel electrode, a sub storage line that extends from the main storage line and substantially parallel to the data line to overlap the sub pixel electrode, and a protruding storage line that extends from the sub storage line and substantially parallel to the gate line to overlap the main pixel electrode.

46 Claims, 14 Drawing Sheets

ARRAY SUBSTRATE AND DISPLAY PANEL HAVING THE SAME

CROSS-REFERENCE TO RELATED APPLICATIONS

This application claims priority from and the benefit of Korean Patent Application No. 10-2006-0107006, filed on Nov. 1, 2006, which is hereby incorporated by reference for all purposes as if fully set forth herein.

BACKGROUND OF THE INVENTION

1. Field of the Invention

The present invention relates to an array substrate and a display panel including the same. More particularly, the present invention relates to an array substrate that may be capable of improving display quality and a display panel including the same.

2. Discussion of the Background

A liquid crystal display (LCD) device as a flat panel display device includes an LCD panel displaying an image by using optical characteristics of the liquid crystal and a backlight assembly disposed under the LCD panel to provide light to the LCD panel.

The LCD panel includes an array substrate, a color filter substrate facing the array substrate, and a liquid crystal layer disposed between the array substrate and the color filter substrate.

The array substrate typically includes a gate line extending in a first direction, a data line extending in a second direction crossing the first direction, a thin film transistor (TFT) connected to the gate line and the data line, a pixel electrode connected to the TFT, and a storage line overlapping the pixel electrode.

The pixel electrode may be separated into two parts to improve the viewing angle of the flat panel display device. For example, the pixel electrode may include a first pixel electrode to which a first voltage is applied and a second pixel electrode to which a second voltage, having a lower level than the first voltage, is applied. A drain electrode of the TFT is connected to the first pixel electrode directly and overlaps the second pixel electrode to form a capacitor.

As such, the second pixel electrode is not connected to the drain electrode, but rather, is floated with respect to the drain electrode. Thus, when a residual direct current exists in the second pixel electrode, the second voltage may vary, thereby deteriorating display quality of the LCD device.

SUMMARY OF THE INVENTION

The present invention provides an array substrate that may be capable of improving display quality by reducing the voltage variation in a pixel electrode.

The present invention also provides a display panel including the above-mentioned array substrate.

Additional features of the invention will be set forth in the description which follows, and in part will be apparent from the description, or may be learned by practice of the invention.

The present invention discloses an array substrate including a gate line, a data line, a thin film transistor (TFT), a pixel electrode, and a storage line. The gate line is disposed in a first direction and the data line is disposed in a second direction crossing the first direction. The TFT is connected to the gate line and the data line. The pixel electrode is connected to the TFT and includes a main pixel electrode and a sub pixel electrode surrounding at least a portion of the main pixel electrode. The storage line includes a main storage line that extends substantially parallel to the gate line and across the pixel electrode, a sub storage line that extends from the main storage line and substantially parallel to the data line to overlap the sub pixel electrode, and a protruding storage line that extends from the sub storage line in a direction substantially parallel to the gate line to overlap the main pixel electrode.

The present invention also discloses an array substrate including a gate line, a data line, a TFT, a pixel electrode, and a storage line. The gate line is disposed in a first direction and the data line is disposed in a second direction crossing the first direction. The TFT is connected to the gate line and the data line. The pixel electrode is connected to the TFT and includes a main pixel electrode and a sub pixel electrode surrounding at least a portion of the main pixel electrode. The storage line includes a main storage line that extends substantially parallel to the gate line and across the pixel electrode, a sub storage line that extends from the main storage line and substantially parallel to the data line to overlap the sub pixel electrode, and an extending storage line that extends from the sub storage line and is disposed between the main pixel electrode and the sub pixel electrode.

The present invention also discloses an array substrate including a gate line, a data line, a TFT, a pixel electrode, and a storage line. The gate line is disposed in a first direction and the data line is disposed in a second direction crossing the first direction. The TFT is connected to the gate line and the data line. The pixel electrode is connected to the TFT and includes a main pixel electrode and a sub pixel electrode partly surrounding a portion of the main pixel electrode such that a side portion of the sub pixel electrode is open. The storage line includes a main storage line that extends substantially parallel to the gate line and across the pixel electrode and a sub storage line that extends from the main storage line and substantially parallel to the data line to overlap the main pixel electrode at the open side portion of the sub pixel electrode.

The present invention also discloses a display panel including a color filter substrate, an array substrate, and a liquid crystal layer. The color filter substrate includes a common electrode that has an opening. The array substrate faces the color filter substrate. The liquid crystal layer is disposed between the color filter substrate and the array substrate. The array substrate includes a gate line, a data line, a thin film transistor (TFT), a pixel electrode, and a storage line. The gate line is disposed in a first direction and the data line is disposed in a second direction crossing the first direction. The TFT is connected to the gate line and the data line. The pixel electrode is connected to the TFT and arranged corresponding to the opening of the common electrode to define a plurality of domains by the opening. The pixel electrode includes a main pixel electrode and a sub pixel electrode surrounding at least a portion of the main pixel electrode. The storage line includes a main storage line that extends substantially parallel to the gate line and across the pixel electrode, a sub storage line that extends from the main storage line and substantially parallel to the data line to overlap the sub pixel electrode, and a protruding storage line that extends from the sub storage line in a direction substantially parallel to the gate line to overlap the main pixel electrode.

The present invention also discloses a display panel including a color filter substrate, an array substrate, and a liquid crystal layer. The color filter substrate includes a common electrode that has an opening. The array substrate faces the color filter substrate. The liquid crystal layer is disposed between the color filter substrate and the array substrate. The array substrate includes a gate line, a data line, a thin film transistor (TFT), a pixel electrode, and a storage line. The gate line is disposed in a first direction and the data line is disposed in a second direction that crosses the first direction. The TFT is connected to the gate line and the data line. The pixel electrode is connected to the TFT and arranged corresponding to the opening of the common electrode to define a plurality of domains by the opening. The pixel electrode includes a main pixel electrode and a sub pixel electrode surrounding at least a portion of the main pixel electrode. The storage line includes a main storage line that extends substantially parallel to the gate line and across the pixel electrode, a sub storage line that extends from the main storage line and substantially parallel to the data line to overlap the sub pixel electrode, and an extending storage line that extends from the sub storage line and is arranged between the main pixel electrode and the sub pixel electrode.

The present invention also discloses a display panel including a color filter substrate, an array substrate, and a liquid crystal layer. The color filter substrate includes a common electrode that has an opening. The array substrate faces the color filter substrate. The liquid crystal layer is disposed between the color filter substrate and the array substrate. The array substrate includes a gate line, a data line, a thin film transistor (TFT), a pixel electrode and a storage line. The gate line is disposed in a first direction and the data line is disposed in a second direction crossing the first direction. The TFT is connected to the gate line and the data line. The pixel electrode is connected to the TFT and arranged corresponding to the opening of the common electrode to define a plurality of domains by the opening. The pixel electrode includes a main pixel electrode and a sub pixel electrode partly surrounding a portion of the main pixel electrode such that a side portion of the sub pixel electrode is open. The storage line includes a main storage line that extends substantially parallel to the gate line and across the pixel electrode, and a sub storage line that extends from the main storage line and substantially parallel to the data line to overlap the main pixel electrode through the open side portion of the sub pixel electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
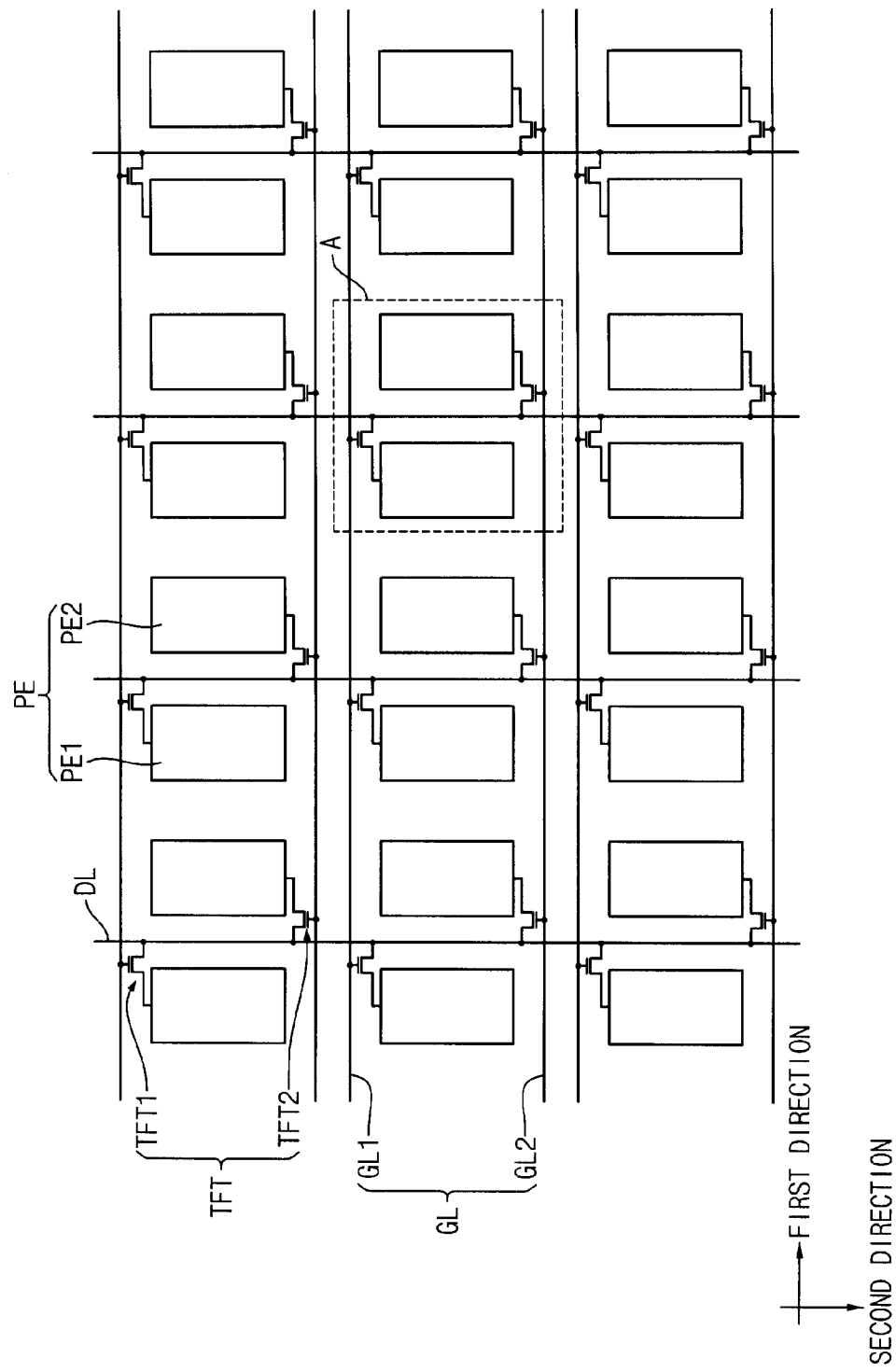
FIG. 1 is a plan view showing a display panel according to a first exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

FIG. 1 is a plan view showing a display panel according to a first exemplary embodiment of the present invention.

Referring to FIG. 1, the positional relationship between parts of a display panel according to an exemplary embodiment of the present invention will be described.

A gate line GL extends in a first direction. A data line DL extends in a second direction crossing the first direction. The first direction and the second direction may be substantially perpendicular to each other.

A thin film transistor TFT is connected to the gate line GL and the data line DL. The pixel electrode PE is connected to the thin film transistor TFT. When a gate signal is applied to the gate line GL and a data signal is applied to the data line DL, the pixel electrode PE receives a driving voltage from the thin film transistor TFT.

Particularly, the pixel electrode PE includes a first pixel electrode PE1 and a second pixel electrode PE2 that are disposed on opposite sides of the data line DL. For example, the first pixel electrode PE1 is formed to the left of the data line DL, and the second pixel electrode PE2 is formed to the right of the data line DL.

The gate line GL includes a first gate line GL1 and a second gate line GL2 disposed on opposite sides of the pixel electrode PE along the second direction. For example, the first gate line GL1 is formed above the pixel electrode PE, and the second gate line GL2 is formed below the pixel electrode PE.

The thin film transistor TFT includes a first thin film transistor TFT1 and a second thin film transistor TFT2. The first thin film transistor TFT1 is connected to the data line DL, the first gate line GL1, and the first pixel electrode PE1. The second thin film transistor TFT2 is connected to the data line DL, the second gate line GL2, and the second pixel electrode PE2.

There may be a plurality of gate lines GL, data lines DL, pixel electrodes PE, and thin film transistors TFTs arranged in a matrix shape, in addition to the above positional relationship.

Figure 2:
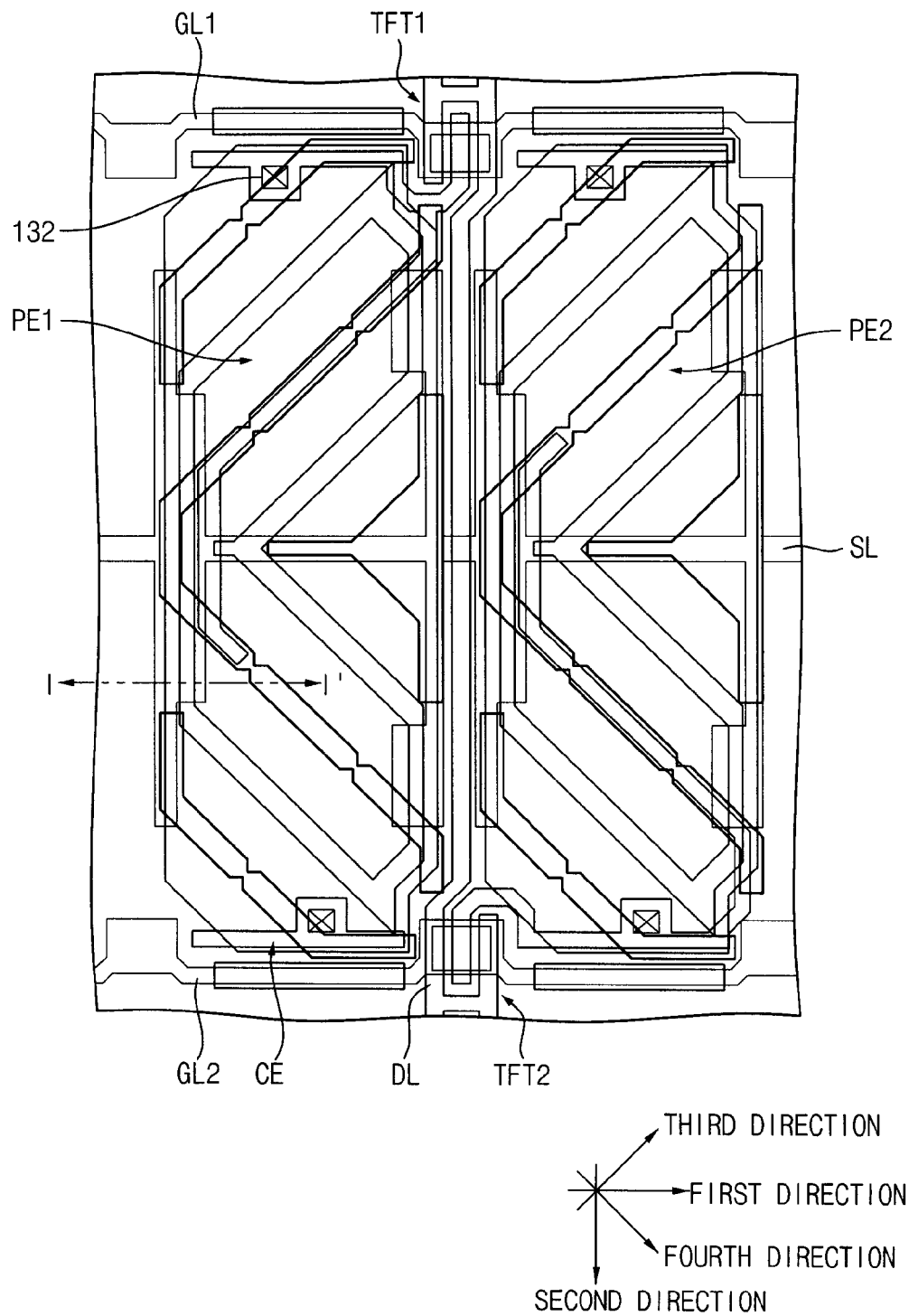
FIG. 2 is an enlarged plan view of portion 'A' in FIG. 1.
Figure 3:
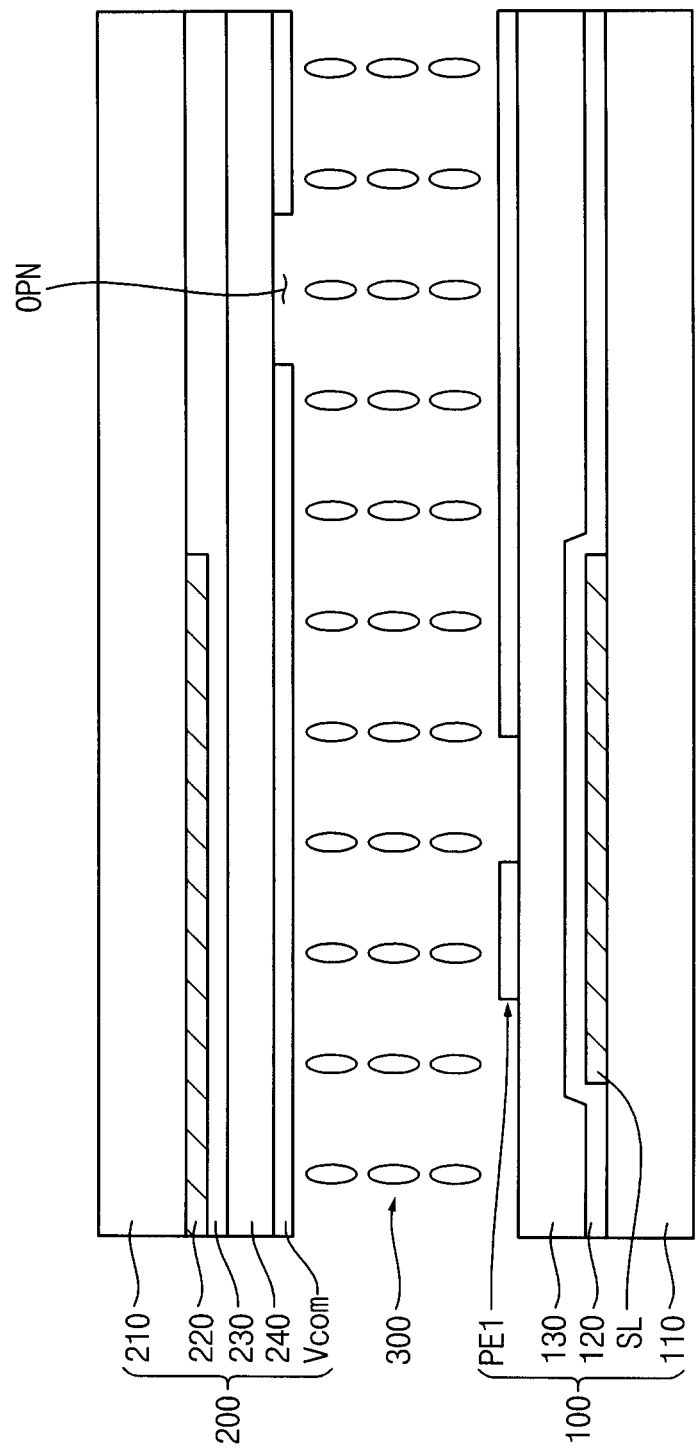
FIG. 3 is a cross-sectional view taken along line I-I' in FIG. 2.

FIG. 2 is an enlarged plan view of portion 'A' in FIG. 1. FIG. 3 is a cross-sectional view taken along line I-I' in FIG. 2.

Referring to FIG. 2 and FIG. 3, a display panel according to the present exemplary embodiment includes an array substrate 100, a color filter substrate 200, and a liquid crystal layer 300.

The array substrate 100 includes a first transparent substrate 110, a gate insulation layer 120, a protective layer 130, a gate line GL, a data line DL, a thin film transistor TFT, a pixel electrode PE, and a storage line SL. The gate line GL includes a first gate line GL1 and a second gate line GL2. The thin film transistor TFT includes a first thin film transistor TFT1 and a second thin film transistor TFT2. The pixel electrode PE includes a first pixel electrode PE1 and a second pixel electrode PE2.

The color filter substrate 200 faces the array substrate 100. The color filter substrate 200 includes a second transparent substrate 210, a light-blocking layer 220, a color filter 230, a planarization layer 240, and a common electrode Vcom.

The liquid crystal layer 300 is interposed between the array substrate 100 and the color filter substrate 200. The liquid crystal layer 300 changes optical transmissivity in response to an electric field generated between the array substrate 100 and the color filter substrate 200.

Parts of the array substrate 100 will be described in detail below.

The first transparent substrate 110 may have a flat, rectangular shape, and may include glass, quartz, and synthetic resin.

Figure 4:
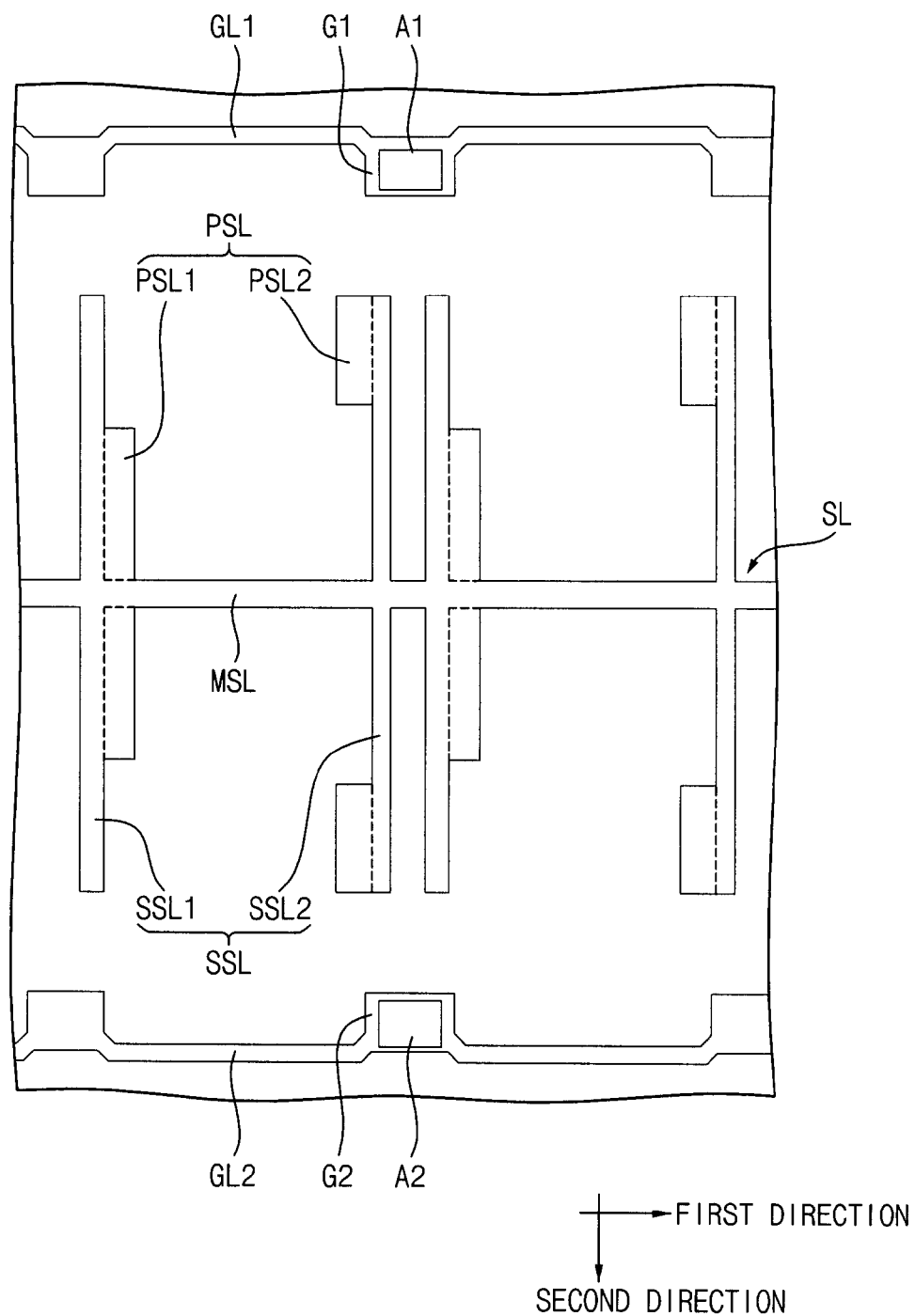
FIG. 4 is a plan view showing a gate line and a storage line in FIG. 2.

FIG. 4 is a plan view showing a gate line and the storage line in FIG. 2.

Referring to FIG. 2, FIG. 3, and FIG. 4, the gate line GL and the storage line SL are formed on the first transparent substrate 11 0.

The gate line GL extends in the first direction. Particularly, the first gate line GL1 and the second gate line GL2 extend substantially parallel to each other in the first direction. A first gate electrode G1 is formed to downwardly protrude from the first gate line GL1, and a second gate electrode G2 is formed to upwardly protrude from the second gate line GL2.

The storage line SL includes a main storage line MSL, a sub storage line SSL, and a protruding storage line PSL.

The main storage line MSL extends substantially parallel to the gate line GL along the first direction. The sub storage line SSL extends from the main storage line MSL in the second direction. The protruding storage line PSL extends from the sub storage line SSL in a direction substantially parallel to the gate line GL.

In the exemplary embodiment, the sub storage line SSL includes a first sub storage line SSL1 and a second sub storage line SSL2. The first sub storage line SSL1 extends from the main storage line MSL in at least one of an upper direction and a lower direction. The second sub storage line SSL2 is spaced apart from the first sub storage line SSL1 in the first direction, and extends from the main storage line MSL in at least one of an upper direction and a lower direction.

Thus, the main storage line MSL and the sub storage line SSL may have, for example, an H-shape, a U-shape or an L-shape when viewed from a plan view. In FIG. 4, the main storage line MSL and the sub storage line SSL have an H-shape viewed from a plan view.

The protruding storage line PSL may include a first protruding storage line PSL1 and a second protruding storage line PSL2. The first protruding storage line PSL 1 protrudes from the first sub storage line SSL1 toward the second sub storage line SSL2. The second protruding storage line PSL2 protrudes from the second sub storage line SSL2 toward the first sub storage line SSL1. In the exemplary embodiment, when the main storage line MSL and sub storage line SSL have an H-shape when viewed from a plan view, a pair of first protruding storage lines PSL1 protrudes from the first sub storage line SSL1, and a pair of second protruding storage lines PSL2 protrudes from the second sub storage line SSL2.

The gate insulation layer 120 may be formed on the first transparent substrate 110 to cover the gate line GL and the storage line SL.

A first active pattern A1 may be formed on the gate insulation layer 120 corresponding to the first gate electrode G1, and a second active pattern A2 may be formed on the gate insulation layer 120 corresponding to the second gate electrode G2.

Figure 5:
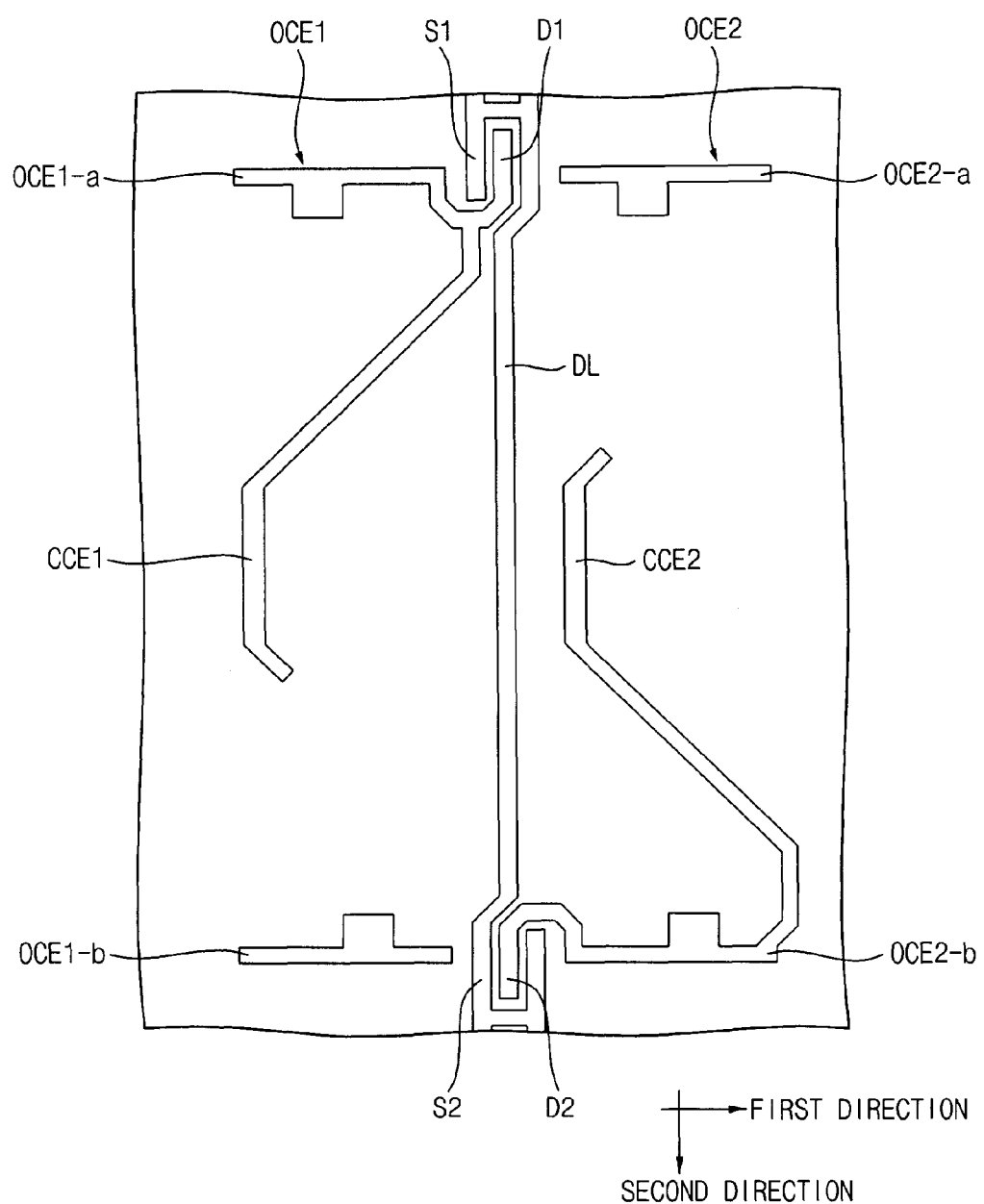
FIG. 5 is a plan view showing a data line and a connection electrode in FIG. 2.

FIG. 5 is a plan view showing a data line and a connection electrode in FIG. 2.

Referring to FIG. 2, FIG. 3, and FIG. 5, a data line DL and a connection electrode CE are formed on the gate insulation layer 120.

The data line DL extends in the second direction substantially perpendicular to the first direction. A first source electrode SI and a second source electrode S2 extend from the data line DL. The first source electrode S1 overlaps the first active pattern A1, and the second source electrode S2 overlaps the second active pattern A2.

The first source electrode S1 may have, for example, a substantially U-shape, a lower portion of which is open. The second source electrode S2 may have, for example, a substantially U-shape, an upper portion of which is open. The first source electrode S1 may be integrally formed with a portion of the adjacent second source electrode S2. Thus, the first source electrode S1 and the adjacent second source electrode S2 may have an H-shape viewed from a plan view.

The first drain electrode D1 overlaps the first active pattern A1 and is spaced apart from the first source electrode S1. The second drain electrode D2 overlaps the second active pattern A2 and is spaced apart from the second source electrode S2.

The connection electrode CE includes a first outer connection electrode OCE1, a first central connection electrode CCE1, a second outer connection electrode OCE2, and a second central connection electrode CCE2. The first outer connection electrode OCE1 and the first central connection electrode CCE1 are formed to the left of the data line DL, and the second outer connection electrode OCE2 and the second central connection electrode CCE2 are formed to the right of the data line DL.

The first outer connection electrode OCE1 includes a first upper electrode OCE1-*a* and a first lower electrode OCE1-*b*. The first upper electrode OCE1-*a* is adjacent to the first gate line GL1. The first lower electrode OCE1-*b* is adjacent to the second gate line GL2 and faces the first upper electrode OCE1-*a*.

The first central connection electrode CCE1 is formed between the first upper electrode OCE1-*a* and the first lower electrode OCE1-*b*. For example, the first central connection electrode CCE1 may be formed at a central portion between the first upper electrode OCE1-*a* and the first lower electrode OCE1-*b*.

The second outer connection electrode OCE2 includes a second upper electrode OCE2-*a* and a second lower electrode OCE2-*b*. The second upper electrode OCE2-*a* is adjacent to the first gate line GL1. The second lower electrode OCE2-*b* is adjacent to the second gate line GL2 and faces the second upper electrode OCE2-*a*.

The second central connection electrode CCE2 is formed between the second upper electrode OCE2-*a* and the second lower electrode OCE2-*b*. For example, the second central connection electrode CCE2 may be formed at a central portion between the second upper electrode OCE2-*a* and the second lower electrode OCE2-*b*.

The first gate electrode G1, the first active pattern A1, the first source electrode S1, and the first drain electrode D1 define the first thin film transistor TFT1. The second gate electrode G2, the second active pattern A2, the second source electrode S2, and the second drain electrode D2 define the second thin film transistor TFT2.

The first drain electrode D1 of the first thin film transistor TFT1 splits into two branches, and is connected to the first upper electrode OCE1-*a* and the first central connection electrode CCE1. The second drain electrode D2 of the second thin film transistor TFT2 extends into two branches, and is connected to the second lower electrode OCE2-*b* and the second central connection electrode CCE2.

The protective layer 130 is formed on the gate insulation layer 120 to cover the data line DL, the thin film transistor TFT, and the connection electrode CE. The protective layer 130 has a contact hole 132 over the first outer connection electrode OCE1 and the second outer connection electrode OCE2. Thus, the contact hole 132 is formed over the first upper electrode OCE1-*a*, the first lower electrode OCE1-*b*, the second upper electrode OCE2-*a*, and the second lower electrode OCE2-*b*.

Figure 6:
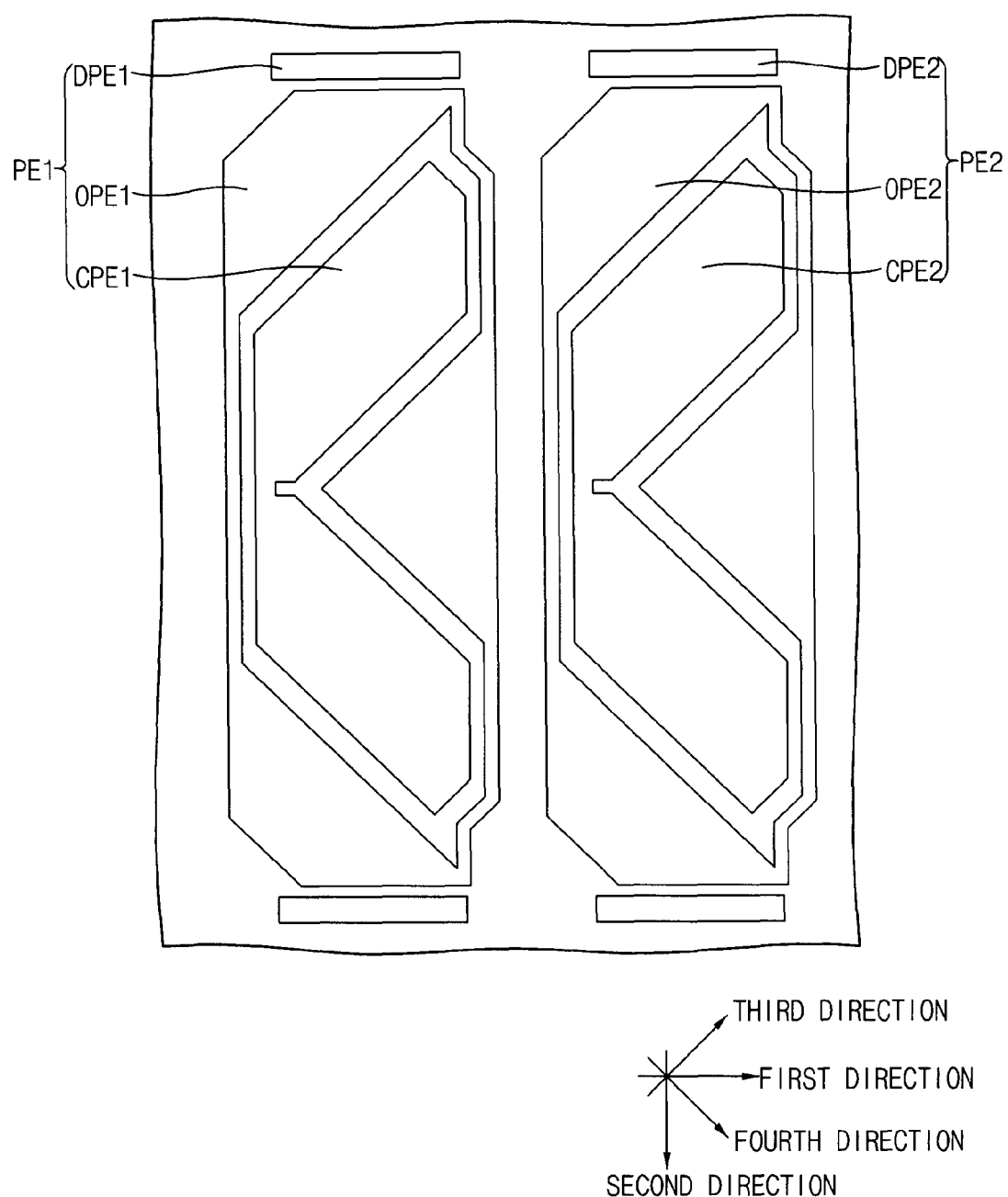
FIG. 6 is a plan view showing a pixel electrode in FIG. 2.

FIG. 6 is a plan view showing a pixel electrode in FIG. 2.

Referring to FIG. 2, FIG. 3, and FIG. 6, the pixel electrode PE is formed on the protective layer 130 between the first gate line GL1 and the second gate line GL2. The pixel electrode PE includes a transparent conductive material.

The pixel electrode PE includes a first pixel electrode PE1 formed to the left of the data line DL and a second pixel electrode PE2 formed to the right of the data line DL.

The first pixel electrode PE1 includes a first main pixel electrode CPE1 and a first sub pixel electrode OPE1, and may optionally include a first dummy pixel electrode DPE1.

The first main pixel electrode CPE1 corresponds to and overlaps the first central connection electrode CCE1. Thus, the first main pixel electrode CPE1 and the first central connection electrode CCE1 are spaced apart from each other to form a first central capacitor.

The first main pixel electrode CPE1 has, for example, a substantially V-shape when viewed from a plan view. The first main pixel electrode CPE1 extends in a third direction and a fourth direction. The third direction is inclined with respect to the first direction, and the fourth direction is substantially perpendicular to the third direction.

The first sub pixel electrode OPE1 surrounds the first main pixel electrode CPE1. For example, the first sub pixel electrode OPE1 may entirely enclose the first main pixel electrode CPE1.

The first sub pixel electrode OPE1 overlaps the first upper electrode OCE1-*a* and the first lower electrode OCE1-*b* of the first outer connection electrode OCE1. The first sub pixel electrode OPE1 is connected to the first upper electrode OCE1-*a* and the first lower electrode OCE1-*b* through the contact hole 132 formed over the first upper electrode OCE1-*a* and the first lower electrode OCE1-*b*. Thus, the first sub pixel electrode OPE1 is connected to the first drain electrode D1 of the first thin film transistor TFT1.

The first dummy pixel electrode DPE1 is spaced apart from the first sub pixel electrode OPE1, and formed over the first gate line GL1 and the second gate line GL2.

The second pixel electrode PE2 includes a second main pixel electrode CPE2 and a second sub pixel electrode OPE2, and may optionally include a second dummy pixel electrode DPE2.

The second main pixel electrode CPE2 corresponds to and overlaps the second central connection electrode CCE2. Thus, the second main pixel electrode CPE2 and the second central connection electrode CCE2 are spaced apart from each other to form a second central capacitor. The second main pixel electrode CPE2 may have, for example, substantially the same shape as the first main pixel electrode CPE1.

The second sub pixel electrode OPE2 surrounds the second main pixel electrode CPE2. For example, the second sub pixel electrode OPE2 may entirely enclose the second main pixel electrode CPE2.

The second sub pixel electrode OPE2 overlaps the second upper electrode OCE2-*a* and the second lower electrode OCE2-*b* of the second outer connection electrode OCE2. The second sub pixel electrode OPE2 is connected to the second upper electrode OCE2-*a* and the second lower electrode OCE2-*b* through the contact holes 132 formed over the second upper electrode OCE2-*a* and the second lower electrode OCE2-*b*. Thus, the second sub pixel electrode OPE2 is connected to the second drain electrode D2 of the second thin film transistor TFT2.

The second dummy pixel electrode DPE2 is spaced apart from the second sub pixel electrode OPE2, and formed over the first gate line GL1 and the second gate line GL2.

The first dummy pixel electrode DPE1 and the second dummy pixel electrode DPE2 are not formed for displaying an image, but rather, are for solving a problem that may be generated during manufacturing the display panel. Thus, the dummy pixel electrodes DPE1 and DPE2 may be omitted.

Hereinafter, referring to FIG. 2 and FIG. 3, parts of the color filter substrate 200 will be described in detail.

The second transparent substrate 210 has, for example, a flat, rectangular shape, and faces the array substrate 100.

The light-blocking layer 220 is formed on the second transparent substrate 210 to cover the gate line GL, the data line DL, the thin film transistor TFT, etc.

The color filter 230 is formed on the second transparent substrate 210, and includes a red color filter, a green color filter, and a blue color filter. For example, the color filter 230 is formed on the second transparent substrate 210 to cover the light-blocking layer 220.

The planarization layer 240 is formed on the color filter 230, and may planarize a surface of the color filter 230.

Figure 7:
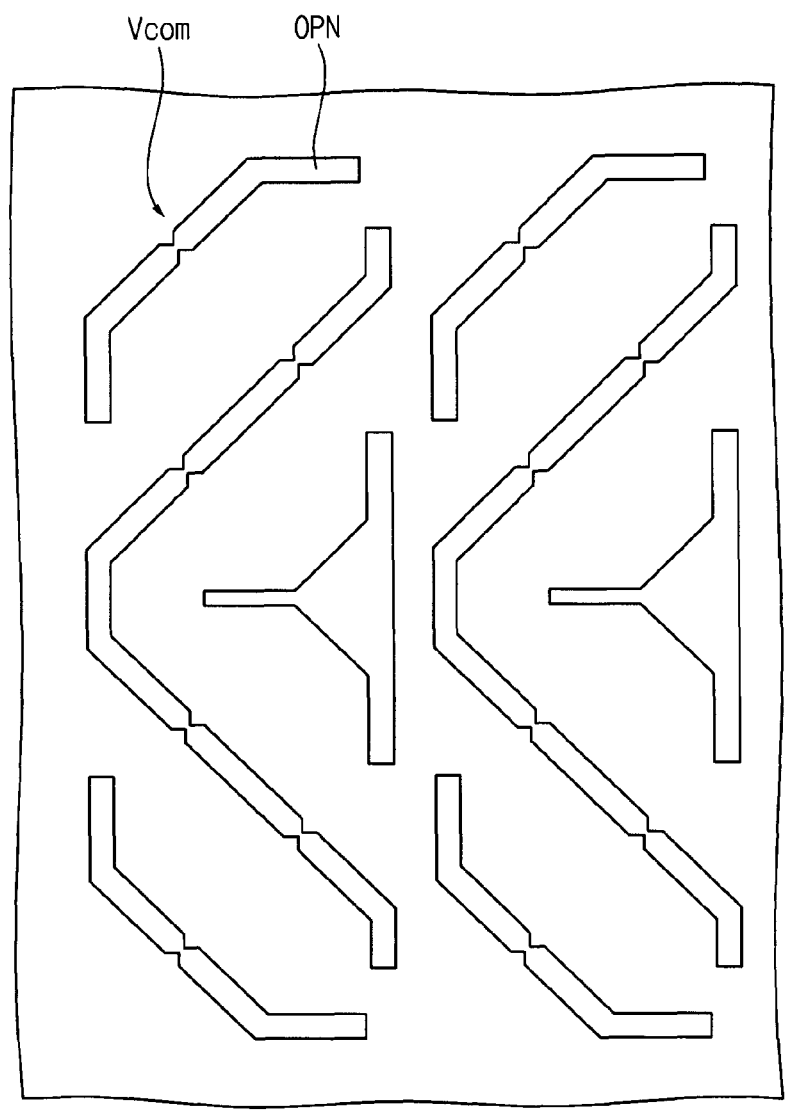
FIG. 7 is a plan view showing a common electrode in FIG. 2.
Figure 7:
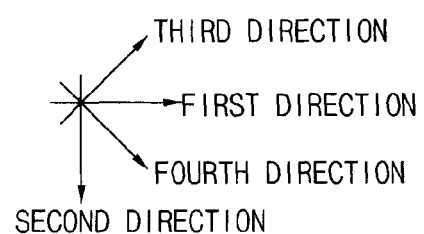

FIG. 7 is a plan view showing a common electrode in FIG. 2.

Referring to FIG. 2, FIG. 3, and FIG. 7, the common electrode Vcom includes a transparent conductive material and is formed on the planarization layer 240.

An opening OPN is formed in the common electrode Vcom to divide the common electrode Vcom and the pixel electrode PE into a plurality of domains. For example, the opening OPN may be formed along a center of the first main pixel electrode CPE1 and a center of the first sub pixel electrode OPE1 to divide the first main pixel electrode CPE1 and the first sub pixel electrode OPE1 into two parts. Also, the opening OPN may be formed along a center of the second main pixel electrode CPE2 and a center of the second sub pixel electrode OPE2 to divide the second main pixel electrode CPE2 and the second sub pixel electrode OPE2 into two parts. Thus, the opening OPN extends in the third direction and in the fourth direction.

Alternatively, instead of the opening OPN, a protrusion (not shown) may be formed on the common electrode Vcom to divide the common electrode Vcom and the pixel electrode PE into a plurality of domains.

Figure 8:
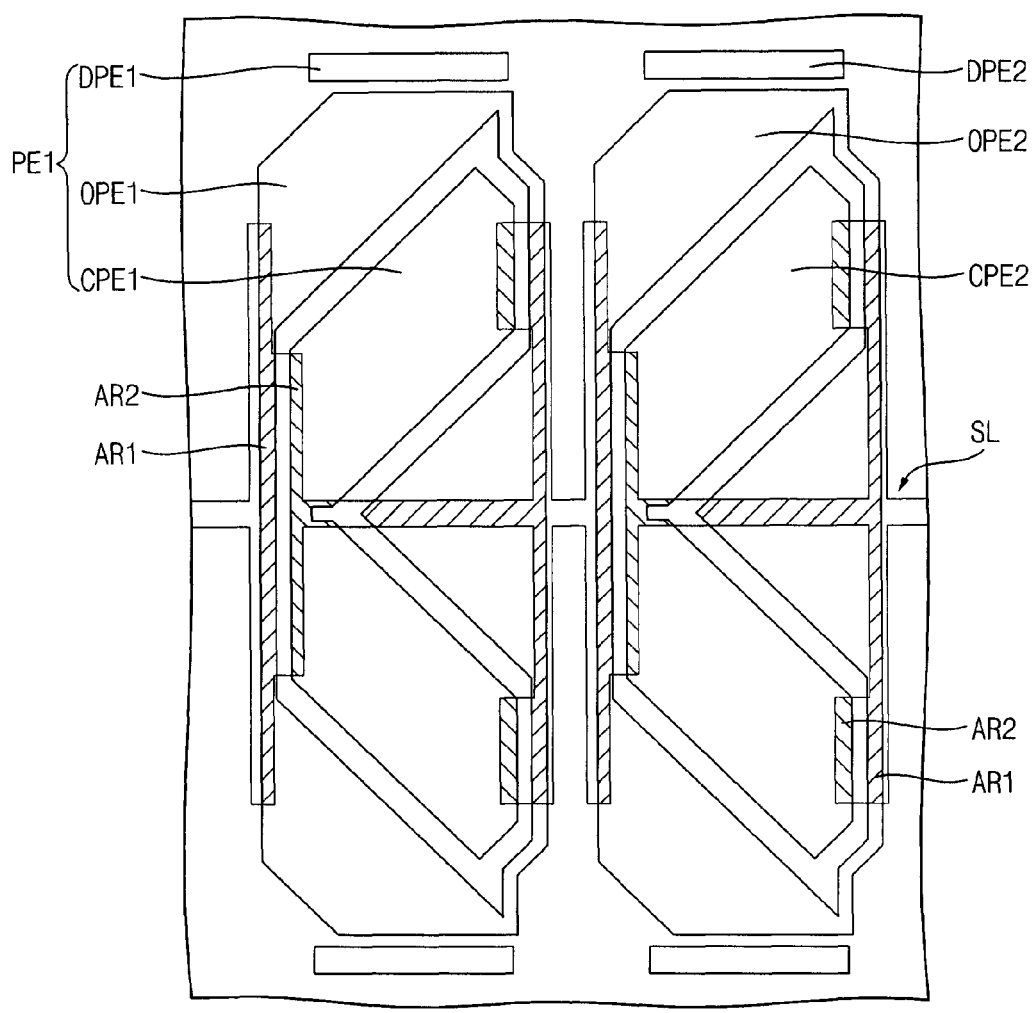
FIG. 8 is a plan view showing the positional relationship between the storage line and a pixel electrode in FIG. 2.

FIG. 8 is a plan view showing a positional relationship between the storage line and a pixel electrode in FIG. 2.

Referring to FIG. 4 and FIG. 8, the storage line SL will be described in detail to give salience to features of an exemplary embodiment.

The storage line SL includes a main storage line MSL, a sub storage line SSL, and a protruding storage line PSL.

The main storage line MSL extends in the first direction that is substantially parallel to the gate line GL, across the first pixel electrode PE1 and the second pixel electrode PE2 of the pixel electrode PE. For example, the main storage line MSL may be formed across the center of the first pixel electrode PE1 and the center of the second pixel electrode PE2. Thus, the first pixel electrode PE1 and the second pixel electrode PE2 may be substantially symmetrical with respect to the main storage line MSL.

The sub storage line SSL extends from the main storage line MSL in the second direction to overlap the first sub pixel electrode OPE1 and the second sub pixel electrode OPE2. The positional relationship between the sub storage line SSL and the first sub pixel electrode OPE1 is substantially the same as the positional relationship between the sub storage line SSL and the second sub pixel electrode OPE2. Thus, only the positional relationship between the sub storage line SSL and the first sub pixel electrode OPE1 will be described in detail.

The sub storage line SSL includes, for example, a first sub storage line SSL1 and a second sub storage line SSL2.

The first sub storage line SSL1 extends from the main storage line MSL in at least one of an upper direction and a lower direction to overlap a first edge portion of the first sub pixel electrode OPE1.

The second sub storage line SSL2 is spaced apart from the first sub storage line SSL1 in the first direction. The second sub storage line SSL2 extends from the main storage line MSL in at least one of an upper direction and a lower direction to overlap a second edge portion of the first sub pixel electrode OPE1. The second edge portion of the first sub pixel electrode OPL1 is opposite the first edge portion of the first sub pixel electrode OPE1.

The protruding storage line PSL extends from the sub storage line SSL, in a direction substantially parallel to the gate line GL, to overlap the first main pixel electrode CPE1 and the second main pixel electrode CPE2. The positional relationship between the protruding storage line PSL and the first main pixel electrode CPE1 is substantially the same as the positional relationship between the protruding storage line PSL and the second main pixel electrode CPE2. Thus, only the positional relationship between the protruding storage line PSL and the first main pixel electrode CPE1 will be described in detail.

The protruding storage line PSL may include, for example, a first protruding storage line PSL1 and a second protruding storage line PSL2.

The first protruding storage line PSL1 protrudes from the first sub storage line SSL1 toward the second sub storage line SSL2 to overlap a first edge portion of the first main pixel electrode CPE1.

The second protruding storage line PSL2 protrudes from the second sub storage line SSL2 toward the first sub storage line SSL1 to overlap a second edge portion of the first main pixel electrode CPE1. The second edge portion of the first main pixel electrode CPE1 is opposite the first edge portion of the first main pixel electrode CPE1.

A first overlapped area AR1 is defined as an area in which the storage line SL overlaps the first sub pixel electrode OPE1 or the second sub pixel electrode OPE2, and a second overlapped area AR2 is defined as an area in which the storage line SL overlaps the first main pixel electrode CPE1 or the second main pixel electrode CPE2. The area of the second overlapped area AR2 may range from about ⅙ to about 1 of the area of the first overlapped area AR1.

Figure 9:
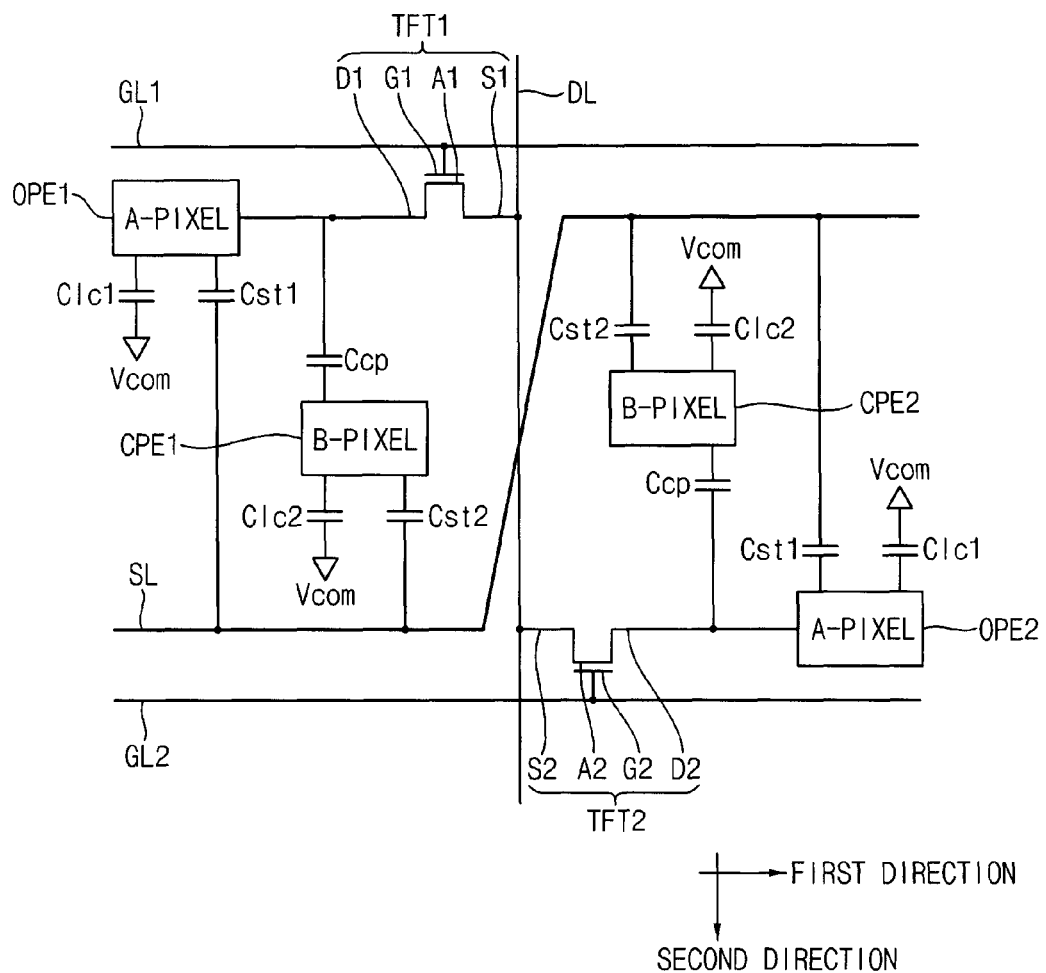
FIG. 9 is a circuit diagram showing an electrical connection corresponding to portion 'A' in FIG. 2.

FIG. 9 is a circuit diagram showing a connection corresponding to portion 'A' FIG. 2.

Referring to FIG. 2 and FIG. 9, a connection of the display panel according to an exemplary embodiment will be described in detail.

The first gate line GL1 and the second gate line GL2 are substantially parallel to each other, and the data line DL is substantially perpendicular to the first gate line GL1 and the second gate line GL2.

The first thin film transistor TFT1 includes a first gate electrode G1, a first active pattern A1, a first source electrode S1, and a first drain electrode D1.

The first gate electrode GI is connected to the first gate line GL1, and the first source electrode S1 is connected to the data line DL. The first drain electrode D1 is connected to the first sub pixel electrode OPE1, and the first drain electrode D1 and the first main pixel electrode CPE1 define a first central capacitor Ccp. The first active pattern A1 connects the first source electrode S1 and the first drain electrode D1 to each other according to a gate signal applied to the first gate electrode G1.

The first sub pixel electrode OPE1 and the common electrode Vcom define a first liquid crystal capacitor Clc1, and the first sub pixel electrode OPE1 and the storage line SL define a first storage capacitor Cst1.

The first main pixel electrode CPE1 and the common electrode Vcom define a second liquid crystal capacitor Clc2, and the first main pixel electrode CPE1 and the storage line SL define a second storage capacitor Cst2.

When the second overlapped area AR2 ranges from about ⅙ to about 1 of the first overlapped area AR1, the capacitance of the second storage capacitor Cst2 ranges from about ⅙ to about 1 of the capacitance of the first storage capacitor Cst1.

The second thin film transistor TFT2 is connected to the data line DL, the second gate line GL2, and the second pixel electrode PE2. The connections of the second thin film transistor TFT2, the second pixel electrode PE2, etc. are substantially the same as the connections of the first thin film transistor TFT1, the first pixel electrode PE1, etc. Thus, any further description will be omitted.

According to the present exemplary embodiment, the protruding storage line PSL extends from the sub storage line SSL, in a direction substantially parallel to the gate line GL to overlap the first main pixel electrode CPE1 and the second main pixel electrode CPE2. Thus, an overlapped area between the storage line SL and the first and second main pixel electrodes CPE1 and CPE2 may be increased, which may reduce the voltage variation of the first main pixel electrode CPE1 and the second main pixel electrode CPE2.

Figure 10:
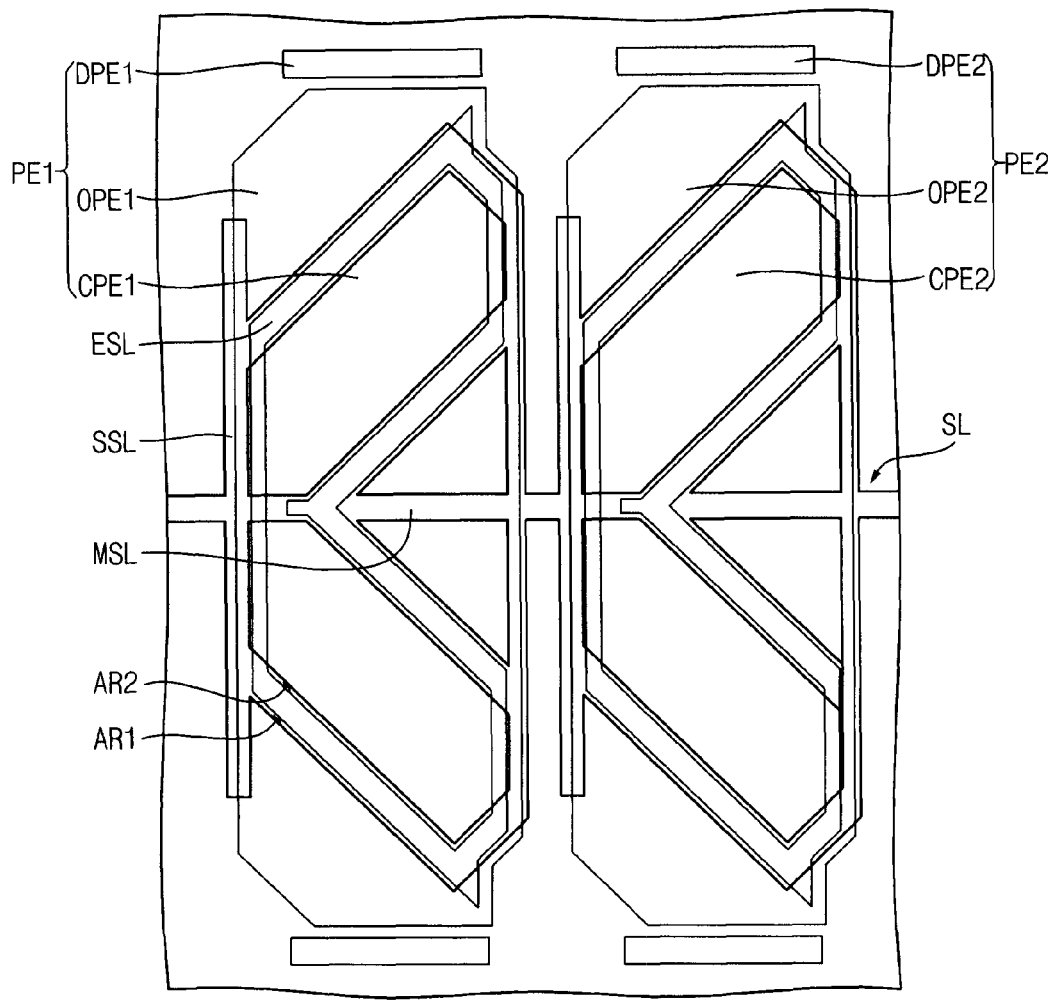
FIG. 10 is a plan view showing the positional relationship between a storage line and a pixel electrode of a display panel according to a second exemplary embodiment of the present invention.
Figure 10:
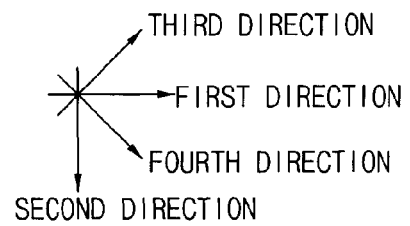
Figure 11:
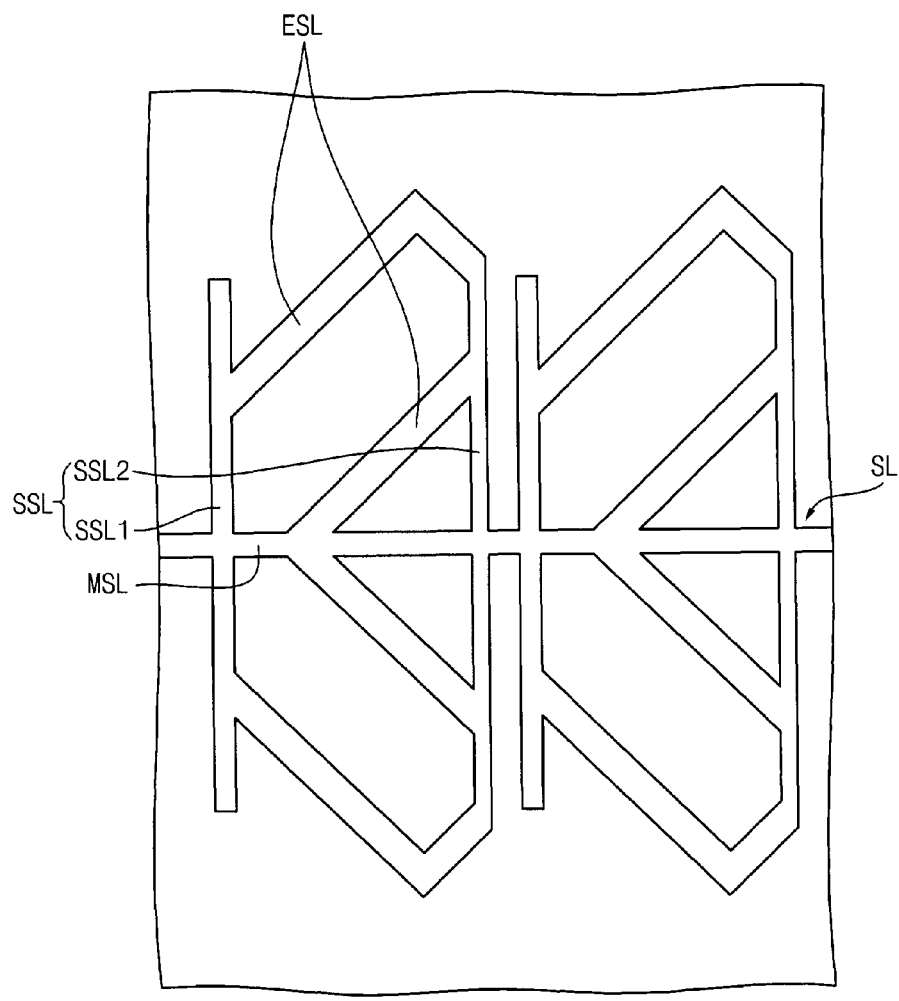
FIG. 11 is a plan view showing the storage line in FIG. 10.

FIG. 10 is a plan view showing the positional relationship between a storage line and a pixel electrode of a display panel according to a second exemplary embodiment of the present invention. FIG. 11 is a plan view showing the storage line in FIG. 10.

The display panel according to the present embodiment is substantially the same as the display panel of the first exemplary embodiment, except with regard to the storage line. Thus, any further description concerning elements other than the storage line will be omitted.

Referring to FIG. 2, FIG. 10, and FIG. 11, a storage line SL includes a main storage line MSL, a sub storage line SSL, and an extending storage line ESL.

The main storage line MSL extends in the first direction that is substantially parallel to the gate line GL, across the first pixel electrode PE1 and the second pixel electrode PE2 of the pixel electrode PE. For example, the main storage line MSL is formed across a center of the first pixel electrode PE1 and a center of the second pixel electrode PE2.

The sub storage line SSL extends from the main storage line MSL in the second direction to overlap the first sub pixel electrode OPE1 and the second sub pixel electrode OPE2. The positional relationship between the sub storage line SSL and the first sub pixel electrode OPE1 is substantially the same as the positional relationship between the sub storage line SSL and the second sub pixel electrode OPE2. Thus, only the positional relationship between the sub storage line SSL and the first sub pixel electrode OPE1 will be described in detail.

The sub storage line SSL includes, for example, a first sub storage line SSL1 and a second sub storage line SSL2. The first sub storage line SSL1 extends from the main storage line MSL in at least one of an upper direction and a lower direction to overlap a first edge portion of the first sub pixel electrode OPE1. The second sub storage line SSL2 is spaced apart from the first sub storage line SSL1 in the first direction. The second sub storage line SSL2 extends from the main storage line MSL in at least one of an upper direction and a lower direction to overlap a second edge portion of the first sub pixel electrode OPE1. The second edge portion of the first sub pixel electrode OPE1 is opposite the first edge portion of the first sub pixel electrode OPE1.

The extending storage line ESL extends from the sub storage line SSL. The extending storage line ESL is formed between the first main pixel electrode CPE1 and the first sub pixel electrode OPE1, and between the second main pixel electrode CPE2 and the second sub pixel electrode OPE2. For example, the extending storage line ESL partially overlaps the first main pixel electrode CPE1 and the first sub pixel electrode OPE1, and also partially overlaps the second main pixel electrode CPE2 and the second sub pixel electrode OPE2.

When the first pixel electrode PE1 and the second pixel electrode PE2 are symmetrical with respect to the main storage line MSL, the extending storage line ESL is also symmetrical with respect to the main storage line MSL. Thus, the extending storage line ESL may be formed at an upper portion and a lower portion of the main storage line MSL.

A first overlapped area AR1 is defined as an area in which the storage line SL overlaps the first sub pixel electrode OPE1 or the second sub pixel electrode OPE2, and a second overlapped area AR2 is defined as an area in which the storage line SL overlaps the first main pixel electrode CPE1 or the second main pixel electrode CPE2. The area of the second overlapped area AR2 may range from about 1/8 to about 1 the area of the first overlapped area AR1.

According to the present exemplary embodiment, the extending storage line ESL is formed between the first main pixel electrode CPE1 and the first sub pixel electrode OPE1, and between the second main pixel electrode CPE2 and the second sub pixel electrode OPE2. Thus, generation of texture between the first main pixel electrode CPE1 and the first sub pixel electrode OPE1, and between the second main pixel electrode CPE2 and the second sub pixel electrode OPE2, may be prevented.

Also, when the extending storage line ESL is formed between the first main pixel electrode CPE1 and the first sub pixel electrode OPE1 and between the second main pixel electrode CPE2 and the second sub pixel electrode OPE2, the voltage variation of the first main pixel electrode CPE1 and the second main pixel electrode CPE2 may be reduced, and an interval between the first main pixel electrode CPE1 and the first sub pixel electrode OPE1 and between the second main pixel electrode CPE2 and the second sub pixel electrode OPE2 may be reduced, which may increase luminance.

Figure 12:
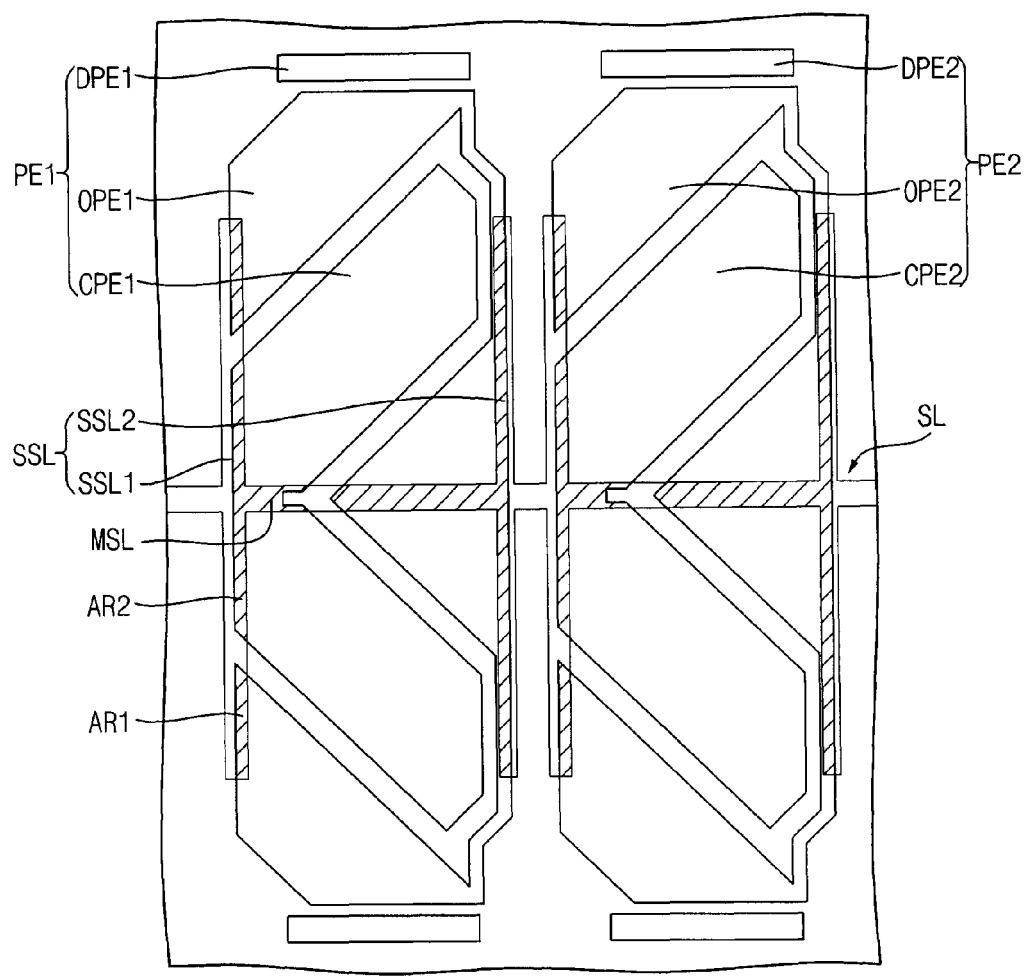
FIG. 12 is a plan view showing the positional relationship between a storage line and a pixel electrode of a display panel according to a third exemplary embodiment of the present invention.
Figure 12:
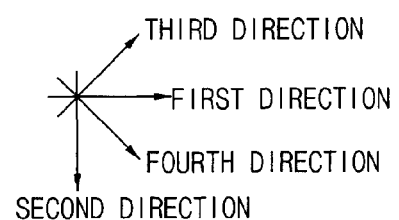
Figure 13:
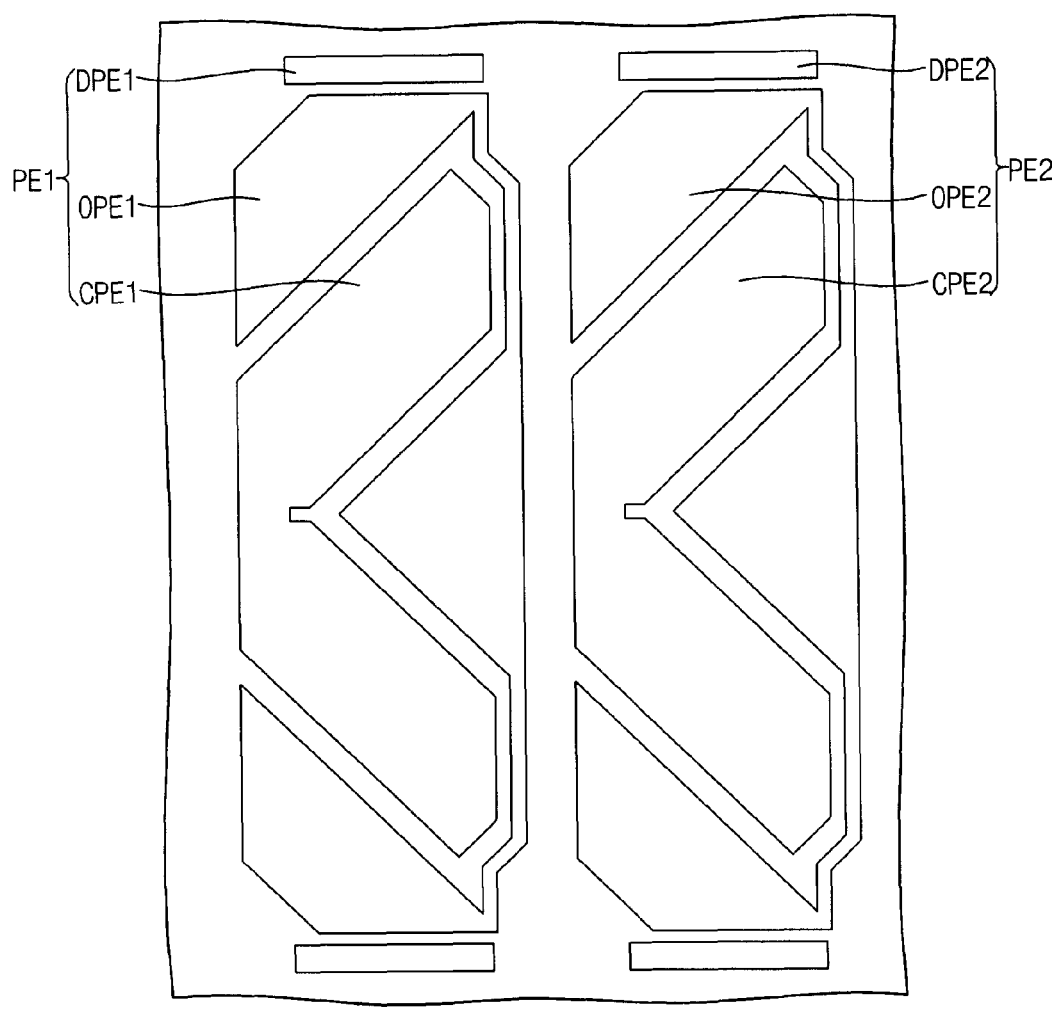
FIG. 13 is a plan view showing a pixel electrode in FIG. 10.
Figure 13:
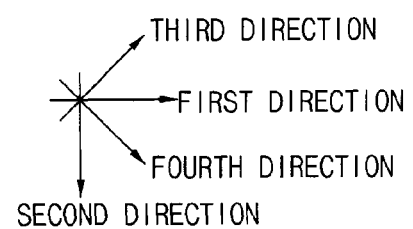

FIG. 12 is a plan view showing the positional relationship between a storage line and a pixel electrode of a display panel according to a third exemplary embodiment of the present invention. FIG. 13 is a plan view showing the pixel electrode in FIG. 10.

The display panel according to the present embodiment is substantially the same as the display panel of the first embodiment except with regard to the pixel electrode and the storage line. Thus, any further description concerning elements other than the pixel electrode and the storage line will be omitted.

Referring to FIG. 2, FIG. 5, FIG. 12, and FIG. 13, a pixel electrode PE includes a first pixel electrode PE1 and a second pixel electrode PE2. The first and second pixel electrodes PE1 and PE2 are disposed on opposite sides of the data line DL.

The first pixel electrode PE1 includes a first main pixel electrode CPE1 and a first sub pixel electrode OPE1, and may optionally include a first dummy pixel electrode DPE1. The second pixel electrode PE2 includes a second main pixel electrode CPE2 and a second sub pixel electrode OPE2, and may optionally include a second dummy pixel electrode DPE2. The first pixel electrode PE1 and the second pixel electrode PE2 have substantially the same shape. Thus, the first pixel electrode PE1 will be described in detail, and any further description for the second pixel electrode PE2 will be omitted.

The first main pixel electrode CPE1 corresponds to and overlaps the first central connection electrode CCE1. The first main pixel electrode CPE1 has, for example, a substantially V-shape viewed in a plan view. Thus, the first main pixel electrode CPE1 extends in a third direction and a fourth direction. The third direction is inclined with respect to the first direction, and the fourth direction is substantially perpendicular to the third direction.

Here, unlike the pixel electrodes of FIG. 6, the first sub pixel electrode OPE1 does not completely surround the first main pixel electrode CPE1. Rather, a side portion of the first sub pixel electrode OPE1 is open. For example, an edge of the first sub pixel electrode OPE1 and an edge of the first main pixel electrode CPE1 may be on the same line with respect to the second direction.

The first sub pixel electrode OPE1 overlaps the first outer connection electrode OCE1. The first sub pixel electrode OPE1 is connected to the first outer connection electrode OCE1 through a contact hole 132 formed over the first outer connection electrode OCE1.

The first dummy pixel electrode DPE1 is spaced apart from the first sub pixel electrode OPE1, and formed over the first gate line GL1 and the second gate line GL2.

The storage line SL includes a main storage line MSL and a sub storage line SSL.

The main storage line MSL extends in the first direction that is substantially parallel to the gate line GL, across the first pixel electrode PE1 and the second pixel electrode PE2 of the pixel electrode PE. For example, the main storage line MSL may be formed across the center of the first pixel electrode PE1 and the center of the second pixel electrode PE2.

The sub storage line SSL extends from the main storage line MSL in the second direction to overlap the first main pixel electrode CPE1, the first sub pixel electrode OPE1, the second main pixel electrode CPE2, and the second sub pixel electrode OPE2.

The positional relationship between the sub storage line SSL, the first main pixel electrode CPE1, and the first sub pixel electrode OPEL1 is substantially the same as the positional relationship between the sub storage line SSL, the second main pixel electrode CPE2, and the second sub pixel electrode OPE2. Thus, only the positional relationship between the sub storage line SSL, the first main pixel electrode CPE1, and the first sub pixel electrode OPE1 will be described in detail.

The sub storage line SSL may include, for example, a first sub storage line SSL1 and a second sub storage line SSL2.

The first sub storage line SSL1 extends from the main storage line MSL in at least one of an upper direction and a lower direction to overlap a first edge portion of the first main pixel electrode CPE1 and a first edge portion of the first sub pixel electrode OPE1. Thus, the first sub storage line SSL1 overlaps not only the first edge portion of the first sub pixel electrode OPE1, but also the first edge portion of the first main pixel electrode CPE1 through the open side portion of the first sub pixel electrode OPE1.

The second sub storage line SSL2 is spaced apart from the first sub storage line SSL1 in the first direction. The second sub storage line SSL2 extends from the main storage line MSL in at least one of an upper direction and a lower direction to overlap a second edge portion of the first sub pixel electrode OPE1. The second edge portion of the first sub pixel electrode OPE1 is opposite the first edge portion of the first sub pixel electrode OPE1.

A first overlapped area AR1 is defined as an area in which the storage line SL overlaps the first sub pixel electrode OPE1 or the second sub pixel electrode OPE2, and a second overlapped area AR2 is defined as an area in which the storage line SL overlaps the first main pixel electrode CPE1 or the second main pixel electrode CPE2. The area of the second overlapped area AR2 may range from about ⅙ to about 1 of the area of the first overlapped area AR1.

According to the present exemplary embodiment, the first sub pixel electrode OPE1 partly surrounds the first main pixel electrode CPE1 such that a side portion of the first sub pixel electrode OPE1 is open, and the second sub pixel electrode OPE2 partly surrounds the second main pixel electrode CPE2 such that a side portion of the second sub pixel electrode OPE2 is open. Thus, the first sub storage line SSL1 of the sub storage line SSL may overlap the first main pixel electrode CPE1 and the second main pixel electrode CPE2 through the open side portion of the first sub pixel electrode OPE1 and the open side portion of the second sub pixel electrode OPE2, respectively.

Accordingly, the area in which the storage line SL overlaps the first main pixel electrode CPE1 and the second main pixel electrode CPE2 may be increased, which may reduce the voltage variation of the first main pixel electrode CPE1 and the second main pixel electrode CPE2.

Figure 14:
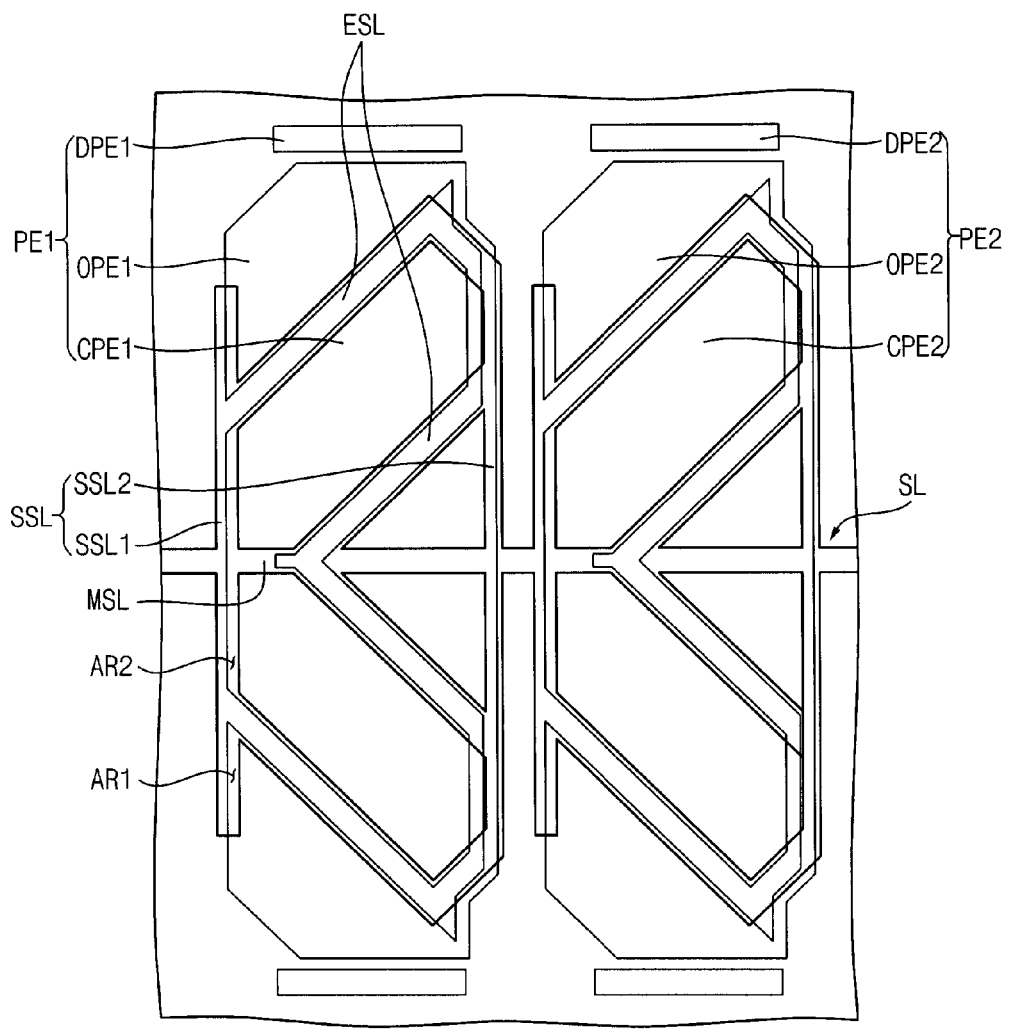
FIG. 14 is a plan view showing the positional relationship between a storage line and a pixel electrode of a display panel according to a fourth exemplary embodiment of the present invention.
Figure 14:
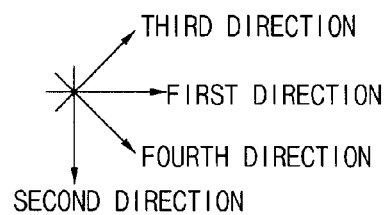

FIG. 14 is a plan view showing the positional relationship between a storage line and a pixel electrode of a display panel according to a fourth exemplary embodiment of the present invention.

The display panel according to the present exemplary embodiment is substantially the same as the display panel of the first exemplary embodiment except with regard to the pixel electrode and the storage line. Thus, any further description concerning elements other than the pixel electrode and the storage line will be omitted.

The display panel according to the present exemplary embodiment may be obtained by selectively combining the features of the three exemplary embodiments previously described. The display panel illustrated in FIG. 14 may be obtained by combining the features of the second and third exemplary embodiments.

Alternatively, the display panel may be obtained by combining the features of the first and second exemplary embodiments, the first and third exemplary embodiments, or the first, second, and third exemplary embodiments.

Referring to FIG. 2, FIG. 5, and FIG. 14, a pixel electrode PE includes a first pixel electrode PE1 and a second pixel electrode PE2. The first and second pixel electrodes PE1 and PE2 are disposed on opposite sides of the data line DL.

The first pixel electrode PE1 includes a first main pixel electrode CPE1 and a first sub pixel electrode OPE1, and may optionally include a first dummy pixel electrode DPE1. The second pixel electrode PE2 includes a second main pixel electrode CPE2 and a second sub pixel electrode OPE2, and may optionally include a second dummy pixel electrode DPE2. The first pixel electrode PE1 and the second pixel electrode PE2 have substantially the same shape. Thus, only the first pixel electrode PE1 will be described in detail.

The first main pixel electrode CPE1 corresponds to and overlaps the first central connection electrode CCE1. The first main pixel electrode CPE1 has, for example, a substantially V-shape when viewed in a plan view.

The first sub pixel electrode OPE1 partly surrounds the first main pixel electrode CPE1 such that a side portion of the first sub pixel electrode OPE1 is open. For example, an edge of the first sub pixel electrode OPE1 and an edge of the first main pixel electrode CPE1 may be on the same line with respect to the second direction. The first sub pixel electrode OPE1 overlaps the first outer connection electrode OCE1. The first sub pixel electrode OPE1 is connected to the first outer connection electrode OCE1 through a contact hole 132.

The first dummy pixel electrode DPE1 is spaced apart from the first sub pixel electrode OPE1, and formed over the first gate line GL1 and the second gate line GL2.

The storage line SL includes a main storage line MSL, a sub storage line SSL, and an extending storage line ESL.

The main storage line MSL extends in the first direction substantially parallel to the gate line GL, across the first pixel electrode PE1 and the second pixel electrode PE2 of the pixel electrode PE. For example, the main storage line MSL may be formed across the center of the first pixel electrode PE1 and the center of the second pixel electrode PE2.

The sub storage line SSL extends from the main storage line MSL in the second direction to overlap the first main pixel electrode CPE1, the first sub pixel electrode OPE1, the second main pixel electrode CPE2, and the second sub pixel electrode OPE2.

The positional relationship between the sub storage line SSL, the first main pixel electrode CPE1, and the first sub pixel electrode OPE1 is substantially the same as the positional relationship between the sub storage line SSL, the second main pixel electrode CPE2 and the second sub pixel electrode OPE2. Thus, the positional relationship between the sub storage line SSL, the first main pixel electrode CPE1, and the first sub pixel electrode OPE1 will be described in detail.

The sub storage line SSL includes, for example, a first sub storage line SSL1 and a second sub storage line SSL2.

The first sub storage line SSL1 extends from the main storage line MSL in at least one of an upper direction and a lower direction to overlap a first edge portion of the first sub pixel electrode OPE1 and overlap a first edge portion of the first main pixel electrode CPE1 through the open side portion of the first sub pixel electrode OPE1

The second sub storage line SSL2 is spaced apart from the first sub storage line SSL1 in the first direction. The second sub storage line SSL2 extends from the main storage line MSL in at least one of an upper direction and a lower direction to overlap a second edge portion of the first sub pixel electrode OPE1. The second edge portion of the first sub pixel electrode OPE1 is opposite the first edge portion of the first sub pixel electrode OPE1.

The extending storage line ESL extends from the sub storage line SSL. The extending storage line ESL is formed between the first main pixel electrode CPE1 and the first sub pixel electrode OPE1, and between the second main pixel electrode CPE2 and the second sub pixel electrode OPE2. For example, the extending storage line ESL may partially overlap the first main pixel electrode CPE1 and the first sub pixel electrode OPE1, and also partially overlap the second main pixel electrode CPE2 and the second sub pixel electrode OPE2.

When the first pixel electrode PE1 and the second pixel electrode PE2 are symmetrical with respect to the main storage line MSL, the extending storage line ESL is also symmetrical with respect to the main storage line MSL.

A first overlapped area AR1 is defined as an area in which the storage line SL overlaps the first sub pixel electrode OPE1 or the second sub pixel electrode OPE2, and a second overlapped area AR2 is defined as an area in which the storage line SL overlaps the first main pixel electrode CPE1 or the second main pixel electrode CPE2. The area of the second overlapped area AR2 may range from about 1/6 to about 1 of the area of the first overlapped area AR1.

According to an exemplary embodiment of the present invention, a protruding storage line extends from the sub storage line, substantially parallel to the gate lines, and overlaps the main pixel electrode. Thus, an overlapped area between the storage line and the main pixel electrode may be increased, which may reduce the voltage variation of the main pixel electrode.

Also, an extending storage line may be formed between the main pixel electrode and the sub pixel electrode, which may prevent a texture defect between the main pixel electrode and the sub pixel electrode, and also may reduce an interval between the main pixel electrode and the sub pixel electrode, thereby increasing luminance.

Further, the sub pixel electrode may partly surround the main pixel electrode such that a side portion of the sub pixel electrode is open, so that the sub storage line may overlap the main pixel electrode through the side portion of the sub pixel electrode. Thus, an overlapped area between the storage line and the main pixel electrode may increase, thereby reducing the voltage variation of the main pixel electrode.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An array substrate, comprising:
a gate line disposed in a first direction;
a data line disposed in a second direction crossing the first direction;
a thin film transistor (TFT) connected to the gate line and the data line;
a pixel electrode connected to the TFT; and
a storage line comprising:
a main storage line that extends substantially parallel to the gate line and crosses a center portion of the pixel electrode;
a sub storage line that extends from the main storage line and substantially parallel to the data line to overlap the pixel electrode; and
a protruding storage line that extends from an end of the sub storage line, which is farthest from the main storage line, in a direction substantially parallel to the gate line.

2. The array substrate of claim 1, wherein the pixel electrode comprises a main pixel electrode and a sub pixel electrode, the main storage line crosses the main pixel electrode and the sub pixel electrode, the sub storage line overlaps the sub pixel electrode, and wherein the protruding storage line overlaps the main pixel electrode.

3. The array substrate of claim 2, wherein the sub storage line comprises a first sub storage line that overlaps a first edge portion of the sub pixel electrode, and a second sub storage line that overlaps a second edge portion of the sub pixel electrode, the second edge portion of the sub pixel electrode being opposite the first edge portion of the sub pixel electrode, and the protruding storage line comprises a first protruding storage line that extends from the first sub storage line to overlap a first edge portion of the main pixel electrode, and a second protruding storage line that extends from the second sub storage line to overlap a second edge portion of the main pixel electrode, the second edge portion of the main pixel electrode being opposite the first edge portion of the main pixel electrode.

4. The array substrate of claim 2, wherein a first pixel electrode and a second pixel electrode are disposed on opposite sides of the data line,
a first gate line and a second gate line are disposed on opposite sides of the pixel electrodes along the second direction, and
a first TFT is connected to the data line, the first gate line, and the first pixel electrode, and a second TFT is connected to the data line, the second gate line, and the second pixel electrode.

5. The array substrate of claim 2, wherein a drain electrode of the TFT is connected to the sub pixel electrode, and the drain electrode of the TFT and the main pixel electrode form a capacitor.

6. The array substrate of claim 2, wherein the storage line further comprises an extending storage line that extends from the sub storage line and is disposed between the main pixel electrode and the sub pixel electrode.

7. The array substrate of claim 2, wherein the sub pixel electrode completely surrounds the main pixel electrode.

8. The array substrate of claim 2, wherein a side portion of the sub pixel electrode is open.

9. The array substrate of claim 2, wherein a second overlapped area defined as an overlapped area between the storage line and the main pixel electrode is greater than or equal to about 1/6 of a first overlapped area defined as an overlapped area between the storage line and the sub pixel electrode.

10. The array substrate of claim 1, wherein a width of the protruding storage line in the direction substantially parallel to the gate line is greater than a width of the sub storage line.

11. The array substrate of claim 1, wherein the protruding storage line overlaps with the pixel electrode.

12. The array substrate of claim 11, wherein a width of the protruding storage line in the direction substantially parallel to the gate line is greater than a width of the sub storage line.

13. An array substrate, comprising:
a gate line disposed in a first direction;
a data line disposed in a second direction crossing the first direction;
a thin film transistor (TFT) comprising a gate electrode connected to the gate line, a source electrode connected to the data line, and a drain electrode spaced apart from the source electrode;
a pixel electrode connected to the TFT, the pixel electrode comprising a main pixel electrode overlapped with the drain electrode and a sub pixel electrode having a length greater than the length of the main pixel electrode in the second direction, the sub pixel electrode surrounding at least a portion of the main pixel electrode; and
a storage line comprising:
a main storage line that extends substantially parallel to the gate line and crosses the main pixel electrode and the sub pixel electrode;
a sub storage line that extends from the main storage line and substantially parallel to the data line to overlap the sub pixel electrode; and
an extending storage line that extends from the sub storage line and is arranged between the main pixel electrode and the sub pixel electrode.

14. The array substrate of claim 13, wherein the extending storage line partially overlaps the sub pixel electrode and the main pixel electrode.

15. The array substrate of claim 14, wherein a second overlapped area defined as an overlapped area between the storage line and the main pixel electrode is greater than or equal to about ⅙ of a first overlapped area defined as an overlapped area between the storage line and the sub pixel electrode.

16. The array substrate of claim 13, wherein the drain electrode of the TFT is connected to the sub pixel electrode, and the drain electrode of the TFT and the main pixel electrode form a capacitor.

17. The array substrate of claim 13, wherein the sub pixel electrode completely surrounds the main pixel electrode.

18. The array substrate of claim 13, wherein extending storage line overlaps a substantially entire portion of a gap between the main pixel electrode and the sub pixel electrode.

19. An array substrate comprising:
a gate line disposed in a first direction;
a data line disposed in a second direction crossing the first direction;
a thin film transistor (TFT) connected to the gate line and the data line;
a pixel electrode connected to the TFT, the pixel electrode comprising a main pixel electrode and a sub pixel electrode partly surrounding a portion of the main pixel electrode such that a side portion of the sub pixel electrode is open; and
a storage line comprising:
a main storage line that extends substantially parallel to the gate line and crosses the main pixel electrode and the sub pixel electrode; and
a sub storage line that extends from the main storage line and substantially parallel to the data line to consecutively overlap both of the sub pixel electrode and the main pixel electrode at the open side portion of the sub pixel electrode.

20. The array substrate of claim 19, wherein a second overlapped area defined as an overlapped area between the storage line and the main pixel electrode is greater than or equal to about ⅙ of a first overlapped area defined as an overlapped area between the storage line and the sub pixel electrode.

21. The array substrate of claim 19, wherein the sub storage line comprises a first sub storage line that overlaps a first edge portion of the sub pixel electrode, and a second sub storage line that overlaps a second edge portion of the sub pixel electrode, the second edge portion of the sub pixel electrode being opposite the first edge portion of the sub pixel electrode, and
wherein the storage line further comprises a protruding storage line, the protruding storage line comprising a first protruding storage line that extends from the first sub storage line to overlap a first edge portion of the main pixel electrode, and a second protruding storage line that extends from the second sub storage line to overlap a second edge portion of the main pixel electrode, the second edge portion of the main pixel electrode being opposite the first edge portion of the main pixel electrode.

22. The array substrate of claim 19, wherein a first pixel electrode and a second pixel electrode are disposed on opposite sides of the data line,
a first gate line and a second gate line are disposed on opposite sides of the pixel electrode along the second direction, and
a first TFT is connected to the data line, the first gate line, and the first pixel electrode, and a second TFT is connected to the data line, the second gate line, and the second pixel electrode.

23. The array substrate of claim 19, wherein a drain electrode of the TFT is connected to the sub pixel electrode, and the drain electrode of the TFT and the main pixel electrode form a capacitor.

24. An array substrate, comprising:
a gate line disposed in a first direction;
a data line disposed in a second direction crossing the first direction;
a thin film transistor (TFT) connected to the gate line and the data line;
a pixel electrode connected to the TFT and having a domain dividing member, the pixel electrode comprising a main pixel electrode and a sub pixel electrode partially surrounding a portion of the main pixel electrode; and
a storage line comprising:
a main storage line that extends substantially parallel to the gate line and crosses a center portion of the pixel electrode;
a sub storage line that extends from the main storage line and substantially parallel to the data line to overlap the pixel electrode; and
an extending storage line that extends from the sub storage line to overlap the sub pixel electrode and the main pixel electrode,
wherein the storage line overlaps at least a portion of the domain dividing member.

25. An array substrate, comprising:
a gate line disposed in a first direction;
a data line disposed in a second direction crossing the first direction;
a thin film transistor (TFT) connected to the gate line and the data line;
a pixel electrode connected to the TFT; and
a storage line comprising:

a main storage line that extends substantially parallel to the gate line and crosses a center portion of the pixel electrode;
a sub storage line that extends from the main storage line and substantially parallel to the data line to overlap the pixel electrode; and
a protruding storage line that extends from the sub storage line in a direction substantially parallel to the gate line, and a width of the protruding storage line in the direction substantially parallel to the gate line is greater than a width of the sub storage line.

26. The array substrate of claim 25, wherein the protruding storage line overlaps with the pixel electrode.

27. The array substrate of claim 25, wherein the protruding storage line extends from an end of the sub storage line, which is farthest from the main storage line.

28. The array substrate of claim 27, wherein the protruding storage line overlaps with the pixel electrode.

29. The array substrate of claim 25, wherein the pixel electrode comprises a main pixel electrode and a sub pixel electrode, and the main storage line crosses the main pixel electrode and the sub pixel electrode, and the sub storage line overlaps the sub pixel electrode, and the protruding storage line overlaps the main pixel electrode.

30. The array substrate of claim 29, wherein the sub storage line comprises a first sub storage line that overlaps a first edge portion of the sub pixel electrode, and a second sub storage line that overlaps a second edge portion of the sub pixel electrode, the second edge portion of the sub pixel electrode being opposite the first edge portion of the sub pixel electrode, and
the protruding storage line comprises a first protruding storage line that extends from the first sub storage line to overlap a first edge portion of the main pixel electrode, and a second protruding storage line that extends from the second sub storage line to overlap a second edge portion of the main pixel electrode, the second edge portion of the main pixel electrode being opposite the first edge portion of the main pixel electrode.

31. The array substrate of claim 29, wherein a first pixel electrode and a second pixel electrode are disposed on opposite sides of the data line,
a first gate line and a second gate line are disposed on opposite sides of the pixel electrodes along the second direction, and
a first TFT is connected to the data line, the first gate line, and the first pixel electrode, and a second TFT is connected to the data line, the second gate line, and the second pixel electrode.

32. The array substrate of claim 29, wherein a drain electrode of the TFT is connected to the sub pixel electrode, and the drain electrode of the TFT and the main pixel electrode form a capacitor.

33. The array substrate of claim 29, wherein the storage line further comprises an extending storage line that extends from the sub storage line and is disposed between the main pixel electrode and the sub pixel electrode.

34. The array substrate of claim 29, wherein the sub pixel electrode completely surrounds the main pixel electrode.

35. The array substrate of claim 29, wherein a side portion of the sub pixel electrode is open.

36. An array substrate, comprising:
a gate line disposed in a first direction;
a data line disposed in a second direction crossing the first direction;
a thin film transistor (TFT) connected to the gate line and the data line;
a pixel electrode connected to the TFT; and
a storage line comprising:
a main storage line that extends substantially parallel to the gate line and crosses a center portion of the pixel electrode;
a sub storage line that extends from the main storage line and substantially parallel to the data line to overlap the pixel electrode; and
a protruding storage line that extends from the sub storage line in a direction substantially parallel to the gate line to overlap with the pixel electrode.

37. The array substrate of claim 36, wherein a width of the protruding storage line in the direction substantially parallel to the gate line is greater than a width of the sub storage line.

38. The array substrate of claim 36, wherein the protruding storage line extends from an end of the sub storage line, which is farthest from the main storage line.

39. The array substrate of claim 38, wherein a width of the protruding storage line in the direction substantially parallel to the gate line is greater than a width of the sub storage line.

40. The array substrate of claim 36, wherein the pixel electrode comprises a main pixel electrode having a voltage due to a capacitor formed between the main pixel electrode and a connection electrode electrically connected to the TFT and a sub pixel electrode spaced apart from the main pixel electrode and electrically connected to the TFT, and the main storage line crosses the main pixel electrode and the sub pixel electrode, and the sub storage line overlaps the sub pixel electrode, and the protruding storage line overlaps the main pixel electrode.

41. The array substrate of claim 40, wherein the sub storage line comprises a first sub storage line that overlaps a first edge portion of the sub pixel electrode, and a second sub storage line that overlaps a second edge portion of the sub pixel electrode, the second edge portion of the sub pixel electrode being opposite the first edge portion of the sub pixel electrode, and
the protruding storage line comprises a first protruding storage line that extends from the first sub storage line to overlap a first edge portion of the main pixel electrode, and a second protruding storage line that extends from the second sub storage line to overlap a second edge portion of the main pixel electrode, the second edge portion of the main pixel electrode being opposite the first edge portion of the main pixel electrode.

42. The array substrate of claim 40, wherein a first pixel electrode and a second pixel electrode are disposed on opposite sides of the data line,
a first gate line and a second gate line are disposed on opposite sides of the pixel electrodes along the second direction, and
a first TFT is connected to the data line, the first gate line, and the first pixel electrode, and a second TFT is connected to the data line, the second gate line, and the second pixel electrode.

43. The array substrate of claim 40, wherein a drain electrode of the TFT is connected to the sub pixel electrode, and the drain electrode of the TFT and the main pixel electrode form a capacitor.

44. The array substrate of claim 40, wherein the storage line further comprises an extending storage line that extends from the sub storage line and is disposed between the main pixel electrode and the sub pixel electrode.

45. The array substrate of claim 40, wherein the sub pixel electrode completely surrounds the main pixel electrode.

46. The array substrate of claim 40, wherein a side portion of the sub pixel electrode is open.

\* \* \* \* \*